(12) United States Patent
Louazel et al.

(10) Patent No.: US 11,572,864 B2
(45) Date of Patent: *Feb. 7, 2023

(54) FLOATING WIND TURBINE PLATFORM CONTROLLED TO OPTIMIZE POWER PRODUCTION AND REDUCE LOADING

(71) Applicant: Principle Power, Inc., Emeryville, CA (US)

(72) Inventors: Pauline Louazel, San Francisco, CA (US); Bingbin Yu, Hayward, CA (US); Sam Kanner, Oakland, CA (US); Antoine Peiffer, Oakland, CA (US); Dominique Roddier, Emeryville, CA (US)

(73) Assignee: Principle Power, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/563,194

(22) Filed: Dec. 28, 2021

(65) Prior Publication Data

US 2022/0120256 A1 Apr. 21, 2022

Related U.S. Application Data

(63) Continuation of application No. 16/427,208, filed on May 30, 2019, now Pat. No. 11,225,945.

(51) Int. Cl.
*B63B 35/44* (2006.01)
*B63B 39/03* (2006.01)
*F03D 7/02* (2006.01)
*F03D 13/25* (2016.01)
*F03D 9/25* (2016.01)

(52) U.S. Cl.
CPC ............ *F03D 7/0204* (2013.01); *B63B 35/44* (2013.01); *B63B 39/03* (2013.01); *F03D 9/25* (2016.05); *F03D 13/25* (2016.05); *B63B 2035/446* (2013.01); *F05B 2240/95* (2013.01);
(Continued)

(58) Field of Classification Search
CPC .......... F03D 13/22; F03D 7/0204; F03D 9/25; F03D 13/25; B63B 35/44; B63B 39/03; B63B 2035/446; F05B 2270/20; F05B 2270/321; F05B 2270/342; F05B 2270/32;
(Continued)

(56) References Cited

U.S. PATENT DOCUMENTS 7,075,189 B2 * 7/2006 Heronemus ............. B63B 35/44
290/55
8,169,099 B2 * 5/2012 Roznitsky ............... F03D 13/25
416/85
(Continued)

*Primary Examiner* — Justin D Seabe
*Assistant Examiner* — Andrew Thanh Bui
(74) *Attorney, Agent, or Firm* — Dergosits & Noah LLP

(57) ABSTRACT

A method for controlling an inclination of a floating wind turbine platform to optimize power production, or to reduce loads on the turbine, tower, and platform, or both, includes receiving data associated with the inclination of the floating wind turbine platform and wind speed and direction data. An angle of difference between the turbine blade plane and the wind direction is determined, where the angle of difference has a vertical component. A platform ballast system is then caused to distribute ballast to reduce the vertical component to a target angle chosen to optimize power production, or reduce turbine, tower, and platform loads, or both.

34 Claims, 20 Drawing Sheets

(52) U.S. Cl.
CPC ....... *F05B 2270/20* (2013.01); *F05B 2270/32* (2013.01); *F05B 2270/321* (2013.01)

(58) Field of Classification Search
CPC .............. F05B 2240/93; F05B 2240/95; F05B 2240/96; Y02E 10/727; Y02E 10/72
See application file for complete search history.

(56) References Cited

U.S. PATENT DOCUMENTS

| | | | | |
|---|---|---|---|---|
| 2014/0339828 | A1* | 11/2014 | Peiffer | B63B 13/00 |
| | | | | 290/44 |
| 2015/0147174 | A1* | 5/2015 | Couchman | B63B 1/107 |
| | | | | 416/37 |
| 2015/0167646 | A1* | 6/2015 | Hammerum | F03D 7/0224 |
| | | | | 416/1 |
| 2015/0211484 | A1* | 7/2015 | Couchman | F03D 13/20 |
| | | | | 416/1 |
| 2015/0367918 | A1* | 12/2015 | Roddier | F03D 7/0204 |
| | | | | 290/44 |

* cited by examiner

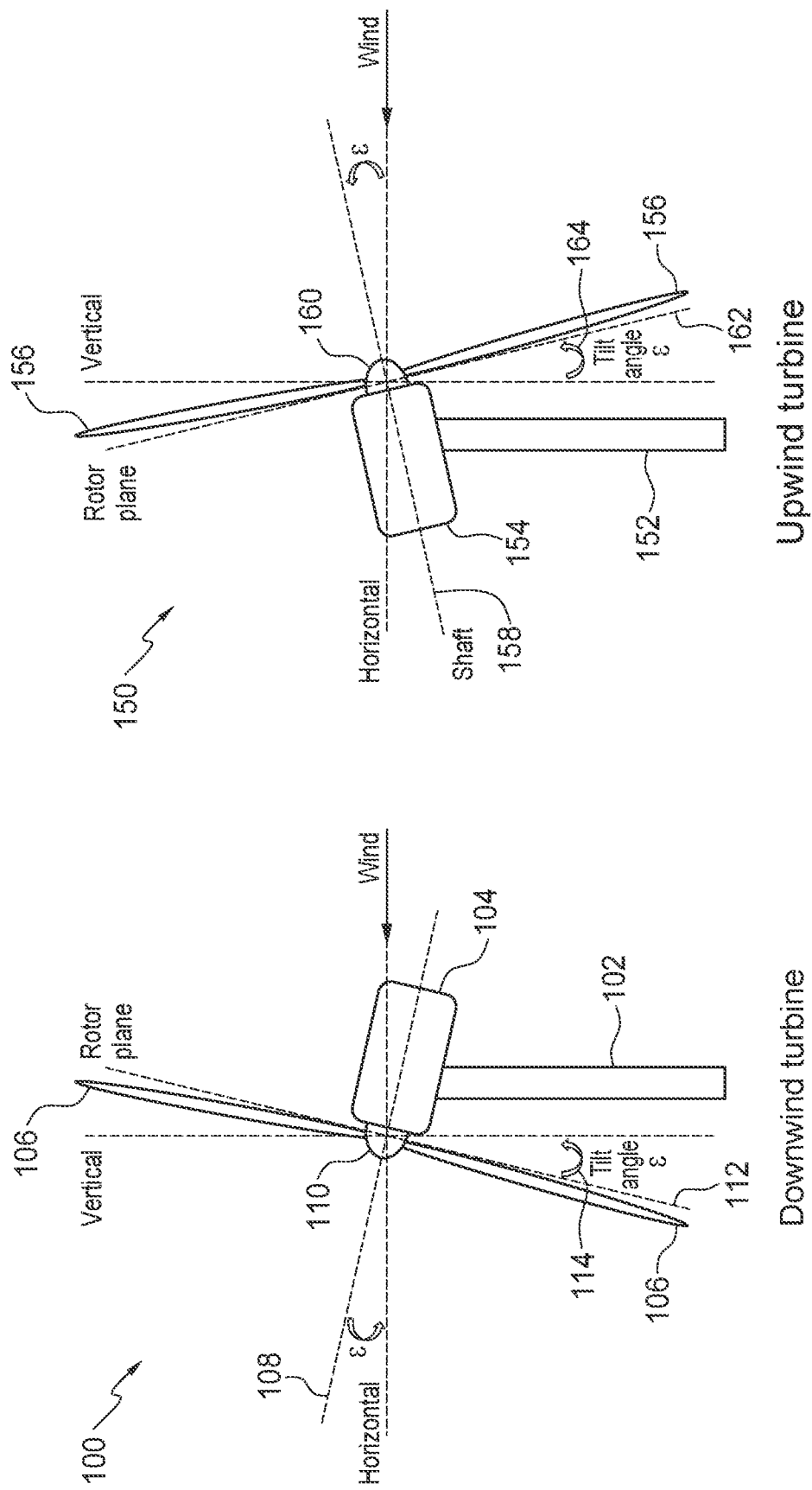

FLOATING WIND TURBINE PLATFORM CONTROLLED TO OPTIMIZE POWER PRODUCTION AND REDUCE LOADING

CROSS REFERENCE

This application is a continuation of U.S. patent application Ser. No. 16/427,208, entitled "Floating Wind Turbine Platform Controlled To Optimize Power Production And Reduce Loading," filed on May 30, 2019, the content of which is hereby incorporated by reference.

This application is related to U.S. patent application Ser. No. 14/841,673, entitled "Floating Wind Turbine Platform With Ballast Control And Water Entrapment Plate Systems," filed on Aug. 31, 2015, now U.S. Pat. No. 9,446,822, which is a continuation of U.S. patent application Ser. No. 14/218,805, entitled "Asymmetric Mooring System for Support of Offshore Wind Turbines," filed on Mar. 18, 2014, now U.S. Pat. No. 9,139,266, which is a continuation of U.S. patent application Ser. No. 13/925,442, filed Jun. 24, 2013, now issued as U.S. Pat. No. 8,692,401, on Apr. 8, 2014, which is a continuation of U.S. patent application Ser. No. 12/988,121, filed Oct. 15, 2010, now issued as U.S. Pat. No. 8,471,396, on Jun. 25, 2013, which is a national stage application of PCT Patent Application No. PCT/US2009/039692, filed Apr. 6, 2009, which claims priority to U.S. Provisional Patent Application No. 61/125,241, titled "Column-Stabilized Offshore Platform With Water-Entrapment Plates And Asymmetric Mooring System For Support Of Offshore Wind Turbines" filed Apr. 23, 2008, the contents of each of which are hereby incorporated by reference.

This application is also related to U.S. patent application Ser. No. 15/856,655, entitled "Methods For Controlling Floating Wind Turbine Platforms," filed on Dec. 28, 2017, which is a continuation of U.S. patent application Ser. No. 14/283,051, entitled "System and Method for Controlling Offshore Floating Wind Turbine Platforms," filed on Mar. 20, 2014, now U.S. Pat. No. 9,879,654, which claims priority to U.S. Provisional Patent Application 61/825,412, entitled, "Fully-Integrated Control System for Offshore Floating Wind Turbine Platforms," filed on May 20, 2013, the contents of each of which are hereby incorporated by reference.

This application is also related to U.S. patent application Ser. No. 14/924,448, entitled "Connection System for Array Cables of Disconnectable Offshore Energy Devices," filed on Oct. 27, 2015, which claims priority to U.S. Provisional Patent Application 62/069,235, entitled, "Connection System for Array Cables of Disconnectable Offshore Energy Devices," filed on Oct. 27, 2014, the contents of each of which are hereby incorporated by reference.

This application is also related to U.S. patent application Ser. No. 15/799,964, entitled "Semi-Submersible Floating Wind Turbine Platform Structure With Water Entrapment Plates," filed on Oct. 31, 2017, which is a continuation of U.S. patent application Ser. No. 15/186,307, entitled, "Floating Wind Turbine Platform Structure With Optimized Transfer Of Wave And Wind Loads," filed on Jun. 17, 2016, now U.S. Pat. No. 9,810,204, the contents of each of which are hereby incorporated by reference.

FIELD

The invention relates to floating wind turbines, and in particular, to controllers for adjusting the inclination of floating wind turbines.

BACKGROUND

Offshore wind energy is a very promising source of renewable energy for the reason that offshore wind is more intense and uniform than on-land wind. To harness wind energy in deeper water further offshore, one solution is to build floating wind turbines. Floating wind turbines face technical challenges that are different from both on-land wind turbines and floating oil and gas platforms.

In contrast to onshore wind turbines, a floating wind turbine requires a platform that provides buoyancy to support the weight of the whole structure. The structure of the platform may have several cylinder-shaped columns with large diameters. Besides providing buoyancy, the platform combined with the wind turbine generator should be able to resist dynamic wind, wave, and current loads, and provide a stable support for power production. Another challenge is the added fatigue damage from wave load, which might be comparable to that from wind load. These loads require the platform to have a robust structural design to achieve better reliability. The traditional way to strengthen the structure is to reinforce with large number of welded stiffeners, which may not be cost efficient and which add weight that is undesirable for a floating platform.

An additional challenge associated with floating wind turbines is the need to minimize their motion dynamics to optimize turbine performance and minimize platform steel weight. Offshore floating wind turbines are typically designed with a specified motion envelope around their even-keel equilibrium position. The equilibrium position is typically chosen to be zero degrees for combined roll and pitch motions to keep the tower vertical as often as possible, which replicates the operating conditions of a land-based or bottom-fixed wind turbine.

Also, for typical existing wind turbines, the power production is capped to the power at rated wind speed. After the rated wind speed is reached, the blades are pitched to stay at this maximum power production—trying to produce more power would require a change of hardware in the turbine itself.

FIG. 1A and FIG. 1B illustrate prior art wind turbine rotor nacelle configurations. Existing horizontal axis wind turbines (HAWTs) 100, 150 present two main components: a tower 102, 152 and a rotor nacelle assembly (RNA) 104, 154. RNA 104, 154 include rotor blades 106, 156 and hubs 110, 160. RNA 104, 154 also include the rotor shaft located inside the nacelle with a rotor shaft axis 108, 158. Blades 106, 156 are supported by hubs 110, 160, located at the end of the rotor shaft. The term "horizontal" is a misnomer used to differentiate from turbines in which the rotor shaft is vertical. As explained, a rotor plane 112, 162 is slightly tilted from the tower by a fixed offset angle 114, 164 (measured with respect to the tower), which, when the tower is vertical, results axes 108, 154 not being horizontal and blade planes 112, 162 being a global offset angle $\varepsilon$ from the vertical. Global offset angle $\varepsilon$, however, will change if the tower is inclined.

Because the wind speed and direction can change frequently a wind turbine controller utilized on a floating platform is typically provided with a wind direction system including a wind direction sensor and a yaw control system. Yaw is defined as rotation of the nacelle about the axis of tower 102, 152, i.e., rotation about an axis that is perpendicular to the horizontal plane. The yaw control system may be housed within nacelle 104, 154. When the wind direction sensor detects shifts in the wind direction, the yaw control system will rotate the nacelle (yaw) at the top of the tower to point the nacelle in the direction of the wind. If an angular offset is detected by the wind direction sensor, the controller can actuate a yaw motor that rotates nacelle 154, hub 160, and turbine blades 156 about tower 102, 152.

In addition, the wind turbine controller is typically provided with a wind speed sensor that is coupled to a turbine pitch control system. In response to changes in detected wind speed the turbine pitch control system responds by inducing a change in the pitch of the turbine blades to optimize the output power or minimize the wind drag forces on the turbine blades.

The three blades of a typical HAWT, however, present a peculiarity: the rotor shaft is not horizontal—it is tilted an offset angle 114, 164 with respect to the horizontal. This inclination moves the weight and thrust of rotors 106, 156 more directly over towers 102, 152. It also increases the clearance between blades 106, 156 and towers 102, 152, which decreases aerodynamic disturbance between the tower and the blades. For an upwind turbine 100, the increased clearance also reduces the probability of blade 106 striking tower 102 (from wind force bending the flexible blade). For a downwind turbine 150 (where the air encounters the tower first and then the blades) the risk of blades 156 bending and striking tower 152 is smaller than for upwind turbine 100. Still, for downwind turbine 150, tilting nacelle 154 upward reduces the wake effect from the tower on the passing blades. The wake effect results in a change to the lift of the blade as it passes the tower and this change creates a corresponding cyclic change to the moment caused by the blade at the hub. Therefore, blade planes 112, 162 are usually tilted at positive fixed offset angles 114, 164 (usually between approximately four and eight degrees) for both upwind and downwind configurations where positive offset angles 114, 164 are measured between blade planes 112, 162 and towers 102, 152.

Due to global offset angle ε, the projected rotor area is slightly decreased compared to what it would be if the shaft were horizontal and the rotor plane vertical (see Equation 2, within). For wind speeds less than rated wind speeds (or "sub-rated" or "under-rated" wind speeds), when the rotor speed is ramping up with the wind speed, the decreased projected area results in an energy loss. In addition, a tilted rotor can cause unnecessary loadings on the rotor drive train and tower.

Thus, there is a need for offshore wind turbines to have a structural platform design that provides load bearing capacity, hydrodynamic stability, and good reliability with minimized cost, and which improves the power produced when winds are at less than rated speeds.

BRIEF DESCRIPTION OF THE FIGURES

The embodiments are illustrated by way of example and not limitation in the figures of the accompanying drawings, in which like references indicate similar elements, and in which:

FIG. 1A and FIG. 1B illustrate prior art wind turbine rotor nacelle configurations;

DETAILED DESCRIPTION

Figure 2B:
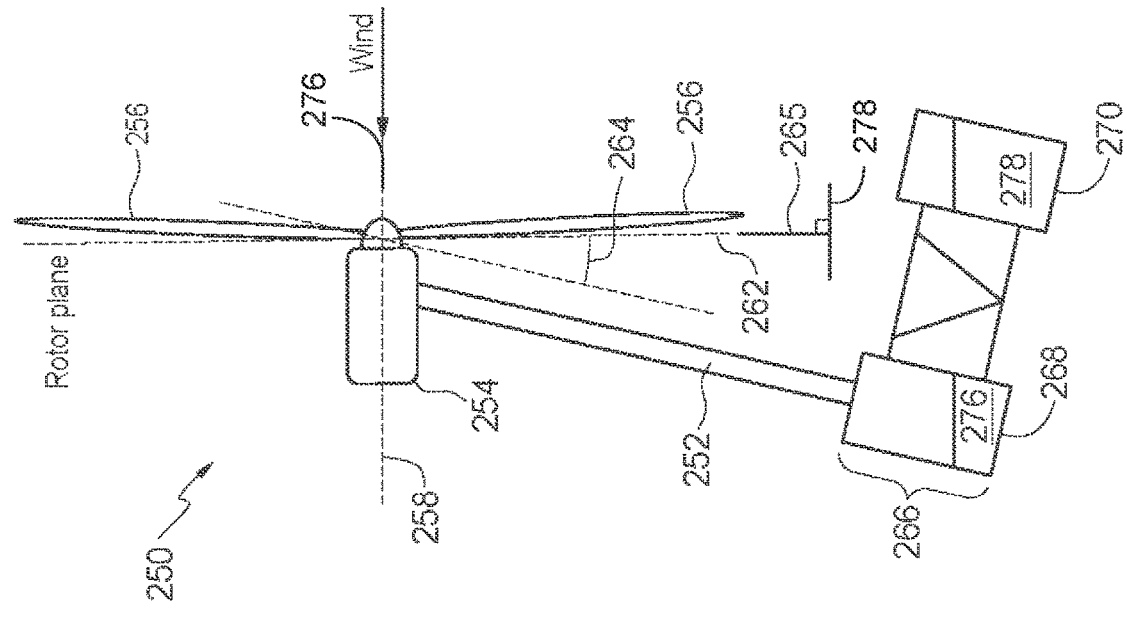
FIG. 2A and FIG. 2B illustrate a floating platform at even keel vs. a floating platform heeled into the wind according to an embodiment.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

The following detailed description is made with reference to the technology disclosed. Embodiments are described to illustrate the technology disclosed, not to limit its scope, which is defined by the claims. Furthermore, aspects of one embodiment may be combined with aspects of another embodiment to create an additional embodiment. Those of ordinary skill in the art will recognize a variety of equivalent variations on the description.

The subject matter in this disclosure provides apparatuses and methods allowing regular HAWTs to be operated with efficiencies on a floating foundation that are increased over the operation of the same HAWT on a fixed foundation that cannot heel. With a typical wind turbine on a typical platform at the equilibrium position of zero degrees, when the rotor speed is ramping up or at speed, the decreased projected area due to the non-vertical blade swept plane (i.e., rotor plane) results in an energy loss. In an embodiment, the energy loss is avoided by inclining the rotor into the wind to bring the rotor plane to or sufficiently close to perpendicular to the horizontal axis, i.e., bring a to zero or sufficiently close thereto. In such embodiments, the ballast (e.g., water) present in the floating platform hull is moved using a marine system controller (or a "platform controller") to incline the floating platform at a target angle that maximizes the rotor projected area and, thus, maximizes the power produced at a given wind speed. In such embodiments, instead of the standard tower vertical equilibrium setting of zero-degrees inclination (i.e., a vertical tower), the inclination of the tower is targeted to reduce or eliminate the global angle ε that the rotor plane is inclined from vertical—typically 6 degrees when the tower is vertical. Thus, in an embodiment, the optimum angle at which the platform is inclined into or away from the wind is dependent on the mean wind speed and wind direction, and is chosen to make the turbine rotor plane perpendicular to the wind direction. Since the angle of the turbine rotor plane to the wind direction can be measured as a sum of a horizontal component (related to the wind direction) and a vertical component (related to the inclination of the rotor plane into or away from the wind), in the embodiment, the target for the vertical component is zero degrees. As discussed within, the target for the vertical component, or "vertical target angle," may be attained by inclining the platform an optimum heel angle ($\delta_{optimum}$).

In an embodiment, the floating platform is inclined to the target angle only for wind speeds that are below the rated speed of the wind turbine. In an embodiment, the floating platform is inclined to the target angle only for wind speeds that are above a minimum wind speed and also below the rated speed of the wind turbine. For example, the wind turbine may require a minimum wind speed of 4 m/s to produce electricity, and may be designed to produce a maximum amount of electricity with wind at a rated speed of 11 m/s.

In an embodiment, when the tower is inclined into the wind, the weight of the RNA and tower create a righting moment about the base of the tower that counteracts the heeling moment created by the aerodynamic rotor/wind interaction. The extend of the righting moment is determined by the weight of the RNA and tower and the distance the center of gravity of the RNA and tower is advanced toward the wind from the base of the tower, which is a function of the platform inclination angle. This righting moment results in a reduction in the moment that must be resisted throughout the tower and particularly at the base of the tower by the floating platform structure. The embodiment thus lowers static loading on the turbine, the tower base, and the floating structure without reducing the power at a given wind speed. In an embodiment, the floating platform may be inclined to the target angle only for wind speeds that are above a minimum wind speed.

In an embodiment, bringing the shaft closer to horizontal or to horizontal also reduces the gravity component of force along the direction of the shaft, reducing the axial loading of the nacelle bearings and associated structure. In the embodiment, with a typical wind turbine on a typical level platform, the non-vertical rotor causes an unnecessary load on the RNA drive train in the direction of the rotor shaft. For example, in the upwind turbine of FIG. 1B, the non-horizontal angle of shaft 158 results in the weight of the rotors 156 and hub 160 imparting a gravity component of force in the direction of shaft 158. This force along shaft 158 must be countered by opposing forces in the bearings and other structure of RNA 154, adding to the thrust force those components encounter caused by the rotor/wind interaction. In the embodiment, the axial loads are reduced by introducing a target inclination to the floating platform that brings the rotor plane closer to the vertical axis.

In an embodiment, depending on: the wind speed; the wind profile; the sea state; or the turbine status, the target angle of platform inclination may also be set to a value slightly different from the initial value of a to maximize rotor power efficiency. That is, in this embodiment the desired final value of ε may not be zero. In other words, this disclosure describes different processes and methods that may be used to find an optimum platform angle $\delta_{optimum}$ for different environmental and turbine parameters, where $\delta_{optimum}$ may be different from the initial value of ε (and different from fixed offset angles 114, 164, 214 (FIG. 2A), 264 (FIG. 2B). In response to finding an optimum angle $\delta_{optimum}$, the active ballast controller is adjusted to target the optimal heel angle $\delta_{optimum}$. In an embodiment, $\delta_{optimum}$ may be determined by measuring power output at varying heel angles and choosing, as the target heel angle, $\delta_{optimum}$, the heel angle that produced the maximum power. In an embodiment, $\delta_{optimum}$ may be dynamic and maintained by a closed loop feedback system with inputs of power output and heel angle. In an embodiment, data of the power output of the turbine may be obtained by an active ballast controller or an integrated controller from sensors or other measuring equipment at a power connection on the platform, a power line from the turbine, or a substation on the platform or elsewhere.

Thus, in general, the various embodiments take advantage of the ability of a floating platform to change its inclination to incline the rotor to increase power production and decrease loads on the RNA and loads at the base of the tower. And, in the various embodiments, the methods used to adjust the ballast to the targeted heel angle may be those disclosed in U.S. patent application Ser. Nos. 12/988,121 and 14/283,051, which are incorporated by reference in its entirety.

Figure 2A:
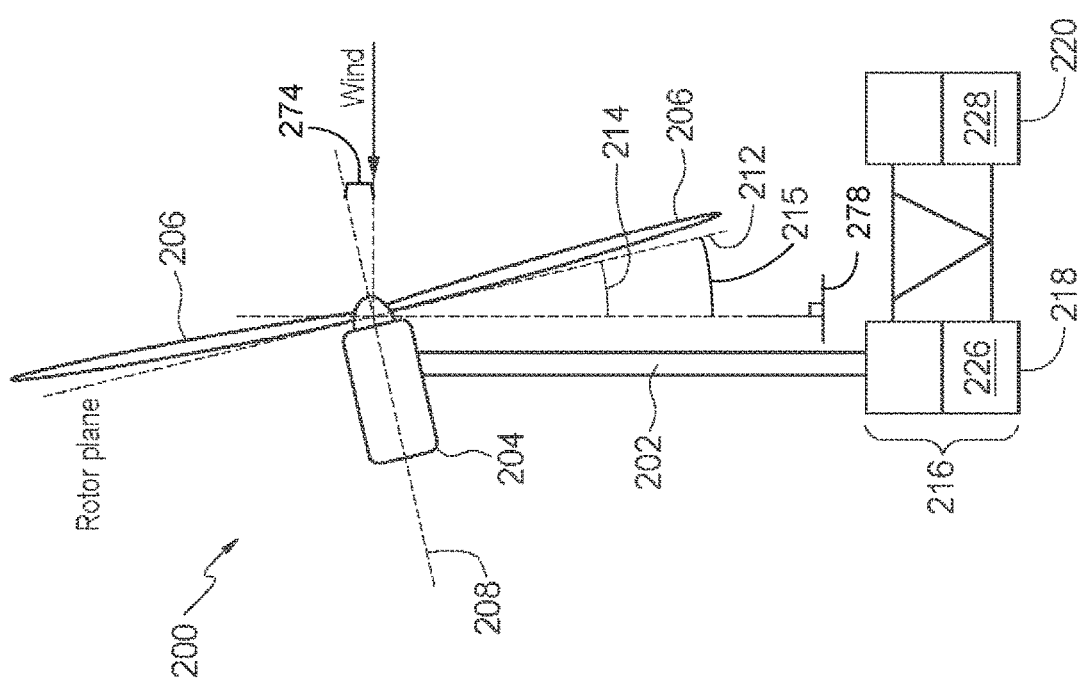
Figure 3:
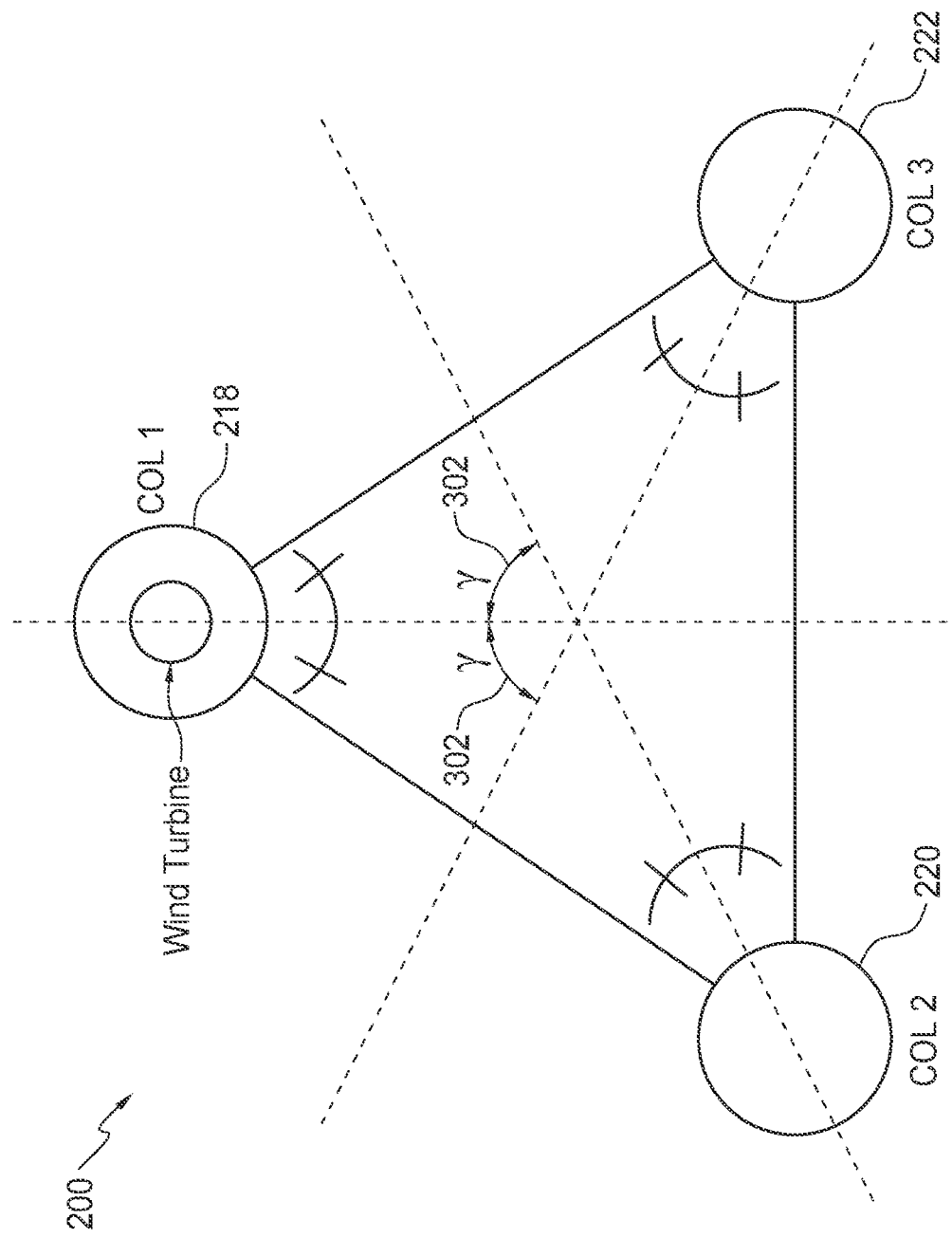
FIG. 3 is a top plan view illustrating a floating platform according to an embodiment.
Figure 5:
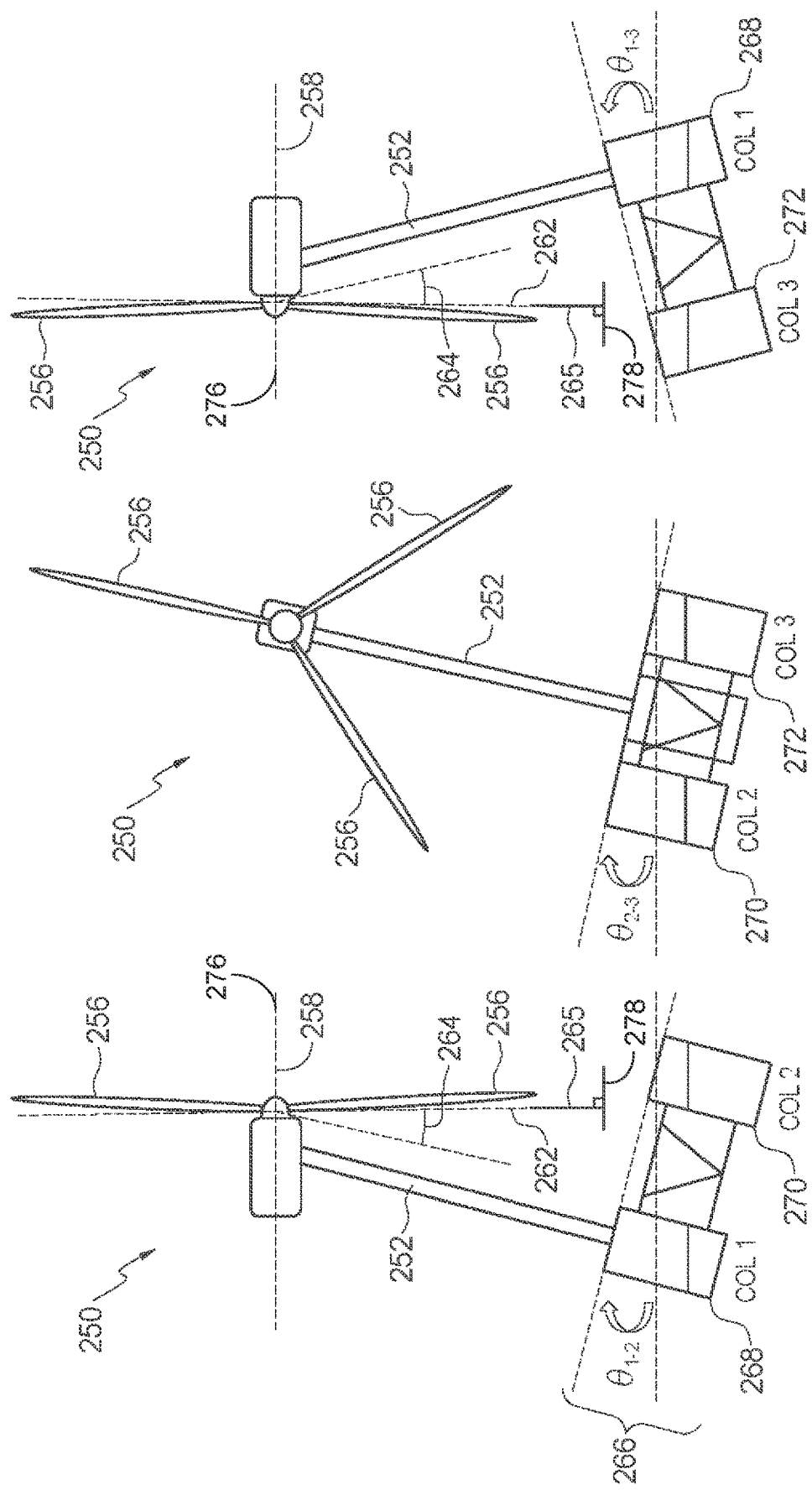
FIGS. 5A, 5B, and 5C illustrate relative angles between the tops of columns of a floating platform and the horizontal according to an embodiment.

FIG. 2A illustrates a floating wind turbine and platform 200 at even keel versus, in FIG. 2B, an identical floating wind turbine 250 heeled into the wind according to an embodiment. Wind turbines and platforms 200, 250 both have upwind turbines with towers 202, 252, RNAs 204, 254. RNAs 204, 254 include rotor blades 206, 256 and turbine shaft axes 208, 258 creating rotor planes 212, 262. Rotor planes 212, 262 are slightly tilted from the tower by a fixed offset angle 214, 264. Rotor planes 212, 262 are a global offset angle ε 215, 265 from the vertical (global offset angle 265 is zero degrees). Floating platforms 216, 266 includes columns 218, 220 and 268, 270 with ballast 226, 228 and 276, 278, respectively. In FIG. 2A and FIG. 3B, a third column 222, 272 is behind columns 220, 270, respectively. Column 222 is illustrated in FIG. 3. Column 272 is illustrated in FIG. 5B and FIG. 5C. In some embodiments, $\delta_{optimum}$ may be chosen to completely eliminate offset angle ε 215, bringing it to zero as shown in angle offset angle ε 265. In other embodiments, $\delta_{optimum}$ may be chosen such that offset angle ε 215 is not completely eliminated and inclining platform 266 to the targeted $\delta_{optimum}$ results in an offset angle ε that is non-zero.

For a wind turbine, e.g., floating wind turbines and platforms 200, 250, power varies according to.

$$P = \tfrac{1}{2}\rho A_{apparent}(\varepsilon) C_p(\varepsilon) V^3 \qquad \text{Equation 1}$$

Where:
ρ is the density of air,
$A_{apparent}$ is the rotor swept area,
$C_p$ is the power coefficient,
V is the wind speed, and
ε is the global rotor plane tilt angle with respect to the vertical (e.g., global offset angles 215, 265), or the global rotor shaft tilt angle with respect to the horizontal.

In Equation 1, the rotor area encountered by the wind is not the rotor absolute area A, but the projection of this area on the vertical axis $A_{apparent}$:

$$A_{apparent} = A \cos \varepsilon \qquad \text{Equation 2}$$

Increasing the rotor swept area by tilting the platform to compensate for ε therefore increases the power production of the turbine. In an embodiment, compensating for ε translates into physically leaning the platform backwards (for a downwind turbine) or forwards (for an upwind turbine) by this angle. In an embodiment illustrated in FIG. 2A and FIG. 2B, the lean is accomplished by shifting platform ballast 226, 228, which is split between columns 218, 220 to cause column 270 to float lower in the water than column 268. Thus, global rotor plane offset ε 215 is reduced from fixed offset angle 214 to global rotor plane offset ε 265, which is zero degrees.

By increasing the apparent rotor plane area for less-than-rated wind speeds (wind speeds for which the turbine is not producing its maximum power), embodiments increase the power production of the floating wind turbine while the rotor speed ramps up to its rated speed.

In addition, for all wind speeds, inclining the rotor to compensate for ε would cause the rotor plane to be perpendicular to the incoming wind flow. As discussed, when the rotor plane is not vertical, i.e., when there is a non-zero vertical component of the rotor angle of inclination, gravity works on the rotors and hub to create an added component of force parallel to the rotor shaft axis—an addition to the thrust force caused by the wind (See FIGS. 8A, 8B, and 8C and related text)—in an amount proportional to the sine of ε multiplied by the mass of the RNA and gravity. This rotor and hub gravity component load creates a moment that is transferred to the base of tower and contributes to the bending moment loads at the bottom of tower and on the floating structure. Therefore, reducing the horizontal force at the top of tower leads to a direct reduction of the loads at the base of tower and on the floating platform. Furthermore, inclining the tower and RNA into the wind creates a righting moment that counteracts the heeling caused by the aerodynamic forces from rotor/wind interaction.

FIG. 3 is a top plan view illustrating floating platform 216 according to an embodiment. In FIG. 3, an angle γ 302 denotes the interior angle between columns 218, 220, 222 of floating platform 216. As said, floating platform 266 is identical.

Figure 4:
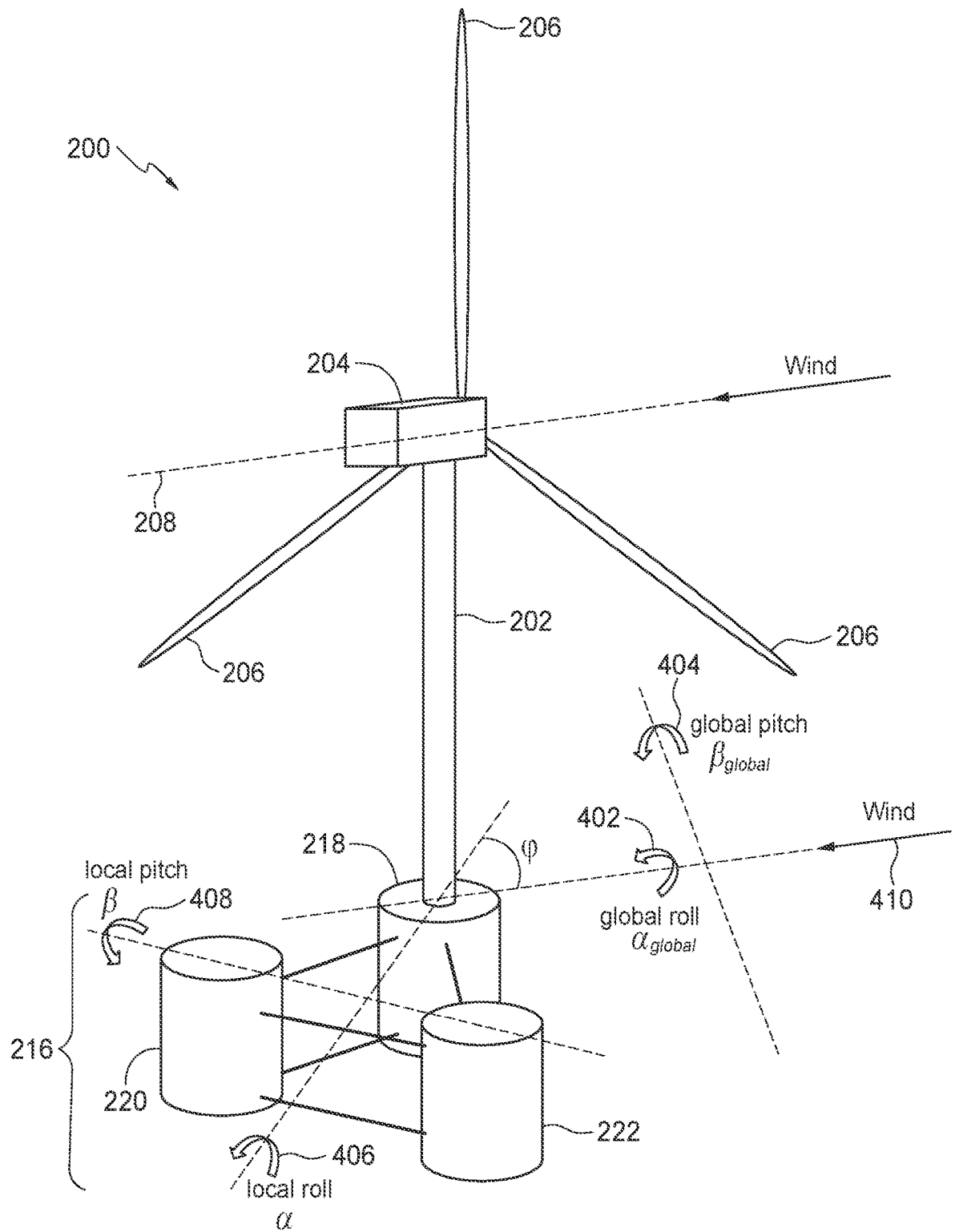
FIG. 4 is a perspective view illustrating local and global roll and pitch reference frames on a floating platform according to an embodiment.

FIG. 4 is a perspective view illustrating local and global roll and pitch reference frames on floating wind turbine and platform 200 according to an embodiment. In FIG. 4, details of the global wind reference frame (global roll α 402 and global pitch β 404) and platform local wind reference frame (local roll α 406 and local pitch β 408) are described with respect to the floating wind platform and turbine 200. For an oncoming wind, φ represents the angle between the wind direction 410 and the platform primary axis. Local roll α 406 is measured about the platform primary axis. An optimum global heel angle ($\delta_{optimum}$) may be defined as the combination of an optimum global roll angle ($\alpha_{global,optimum}$) and an optimum global pitch angle ($\beta_{global,optimum}$) according to the following, which is applicable for small angles.

$$\delta_{optimum} = \sqrt{(\alpha_{global,optimum})^2 + (\beta_{global,optimum})^2} \qquad \text{Equation 3}$$

The targeted local platform roll angle ($\alpha_{set}$) and targeted local platform pitch angle ($\beta_{set}$) may be defined as:

$$\beta_{set} = \cos(\varphi)\beta_{global,optimum} + \sin(\varphi)\alpha_{global,optimum} \qquad \text{Equation 4}$$

$$\alpha_{set} = -\sin(\varphi)\beta_{global,optimum} + \cos(\varphi)\alpha_{global,optimum} \qquad \text{Equation 5}$$

As a result, the targeted relative angles between column 218, 220, 222 top centers can be computed by the following equations (see FIG. 5A, FIG. 5B, and FIG. 5C, and further related discussion within):

$$\theta_{1\text{-}2,set} = -(\sin(\gamma)\beta_{set} + \cos(\gamma)\alpha_{set})$$

$$\theta_{1\text{-}3,set} = -(\sin(\gamma)\beta_{set} - \cos(\gamma)\alpha_{set})$$

$$\theta_{2\text{-}3,set} = \alpha_{set} \qquad \text{Equations 6A, 6B, 6C}$$

For a given pair of columns i, j, the difference between the target angle ($\theta_{i\text{-}j,set}$) and the measured angle ($\theta_{i\text{-}j}$) is an error ($e_{i\text{-}j}$) that may be used as an input to the controller:

$$e_{i\text{-}j} = \theta_{i\text{-}j,set} - \theta_{i\text{-}j} \qquad \text{Equation 7}$$

In Equation 7, the following convention is used. If the error ($e_{i\text{-}j}$) is negative, i.e., $\theta_{i\text{-}j}$ is larger than $\theta_{i\text{-}j,set}$, it means that column i is higher relative to column j than the target value. Based on the error $e_{i\text{-}j}$ being negative, the correct process is to move ballast from column j to column i. In an embodiment, this process will proceed provided that the absolute value of the error ($|e_{i\text{-}j}|$) is greater than a pre-determined value that defines a first (or "ON") dead-band around the targeted heel angle. In the embodiment, the process will not proceed, or will stop, when the absolute value of the error ($|e_{i\text{-}j}|$) is less than a pre-determined value that defines a second (or "OFF") dead-band around the targeted heel angle. Depending on the relative angles $\theta_{i\text{-}j}$ between the several columns, ballast may be moved from one or more of the several columns in the same time. By considering the relative angles between all the column top centers in this manner, the fastest water transfer path to achieve the target angles are always considered. Thus, the active ballast system is controlled to drive the platform to reach the optimum heel angle as quickly as possible regardless of the relative errors between the columns.

In an embodiment, if one of the pumping systems is suddenly deficient, a redundant pumping system is employed according to the approach of Equations 3 through 7.

In an embodiment, a standard Proportional-Integral-Derivative (PID) controller may be used in the correction of the heel angle error.

In an embodiment, a more complex control logic may be used (e.g., a Kalman filter, or others) in the correction of the heel angle.

FIG. 4 illustrates that the plane of rotor blades 206 may be non-perpendicular to wind direction 410 should turbine shaft axis 208 be out of alignment with wind direction 410 by being rotated about tower 202—such misalignment would add a horizontal angular component of error. In addition, platform 216 may be improperly tilted about the axis of global pitch β 404—such misalignment would add a vertical component of error.

In an embodiment where the optimum global roll angle ($\alpha_{global,optimum}$) is zero degrees, which is the preferable condition, Equation 3 reduces to:

$$\delta_{optimum} = \beta_{global,optimum} \quad \text{Equation 8}$$

As a result, the targeted local platform roll angle ($\alpha_{set}$) and targeted local platform pitch angle ($\beta_{set}$) may be defined as:

$$\beta_{set} = \cos(\varphi)\beta_{global,optimum} \quad \text{Equation 9}$$

$$\alpha_{set} = -\sin(\varphi)\beta_{global,optimum} \quad \text{Equation 10}$$

Equations 6A, 6B, 6C for the targeted relative angles between column top centers are unchanged.

FIG. 5A, FIG. 5B, and FIG. 5C illustrate relative angles between the tops of columns 268, 270, 272 of floating wind turbine and platform 250 and the horizontal according to an embodiment. In an example, for a triangularly-shaped platform with three columns, based on the filtered platform roll angle $\bar{\alpha}$ and filtered platform pitch angle $\bar{\beta}$, the relative angles $\theta_{i-j}$ between column top centers i and j (where i and j denote one of the three columns 268, 270, 272), may be determined using Equations 6A, 6B, 6C. Again, angle $\varkappa$ 302 denotes the interior angle between columns 218, 220, 222 as shown in FIG. 3. Equations 6A, 6B, and 6C are adapted for platforms with columns at the vertices of an isosceles or equilateral triangle. These equations may be modified to account for other triangular arrangements or they may be modified to account for platforms of other shapes. As FIG. 5B illustrates, rotor plane 262 may be vertical even where platform 266 is tilted to the side. While this is not an optimum situation for the platform, it would not negatively impact power generation.

Figure 6:
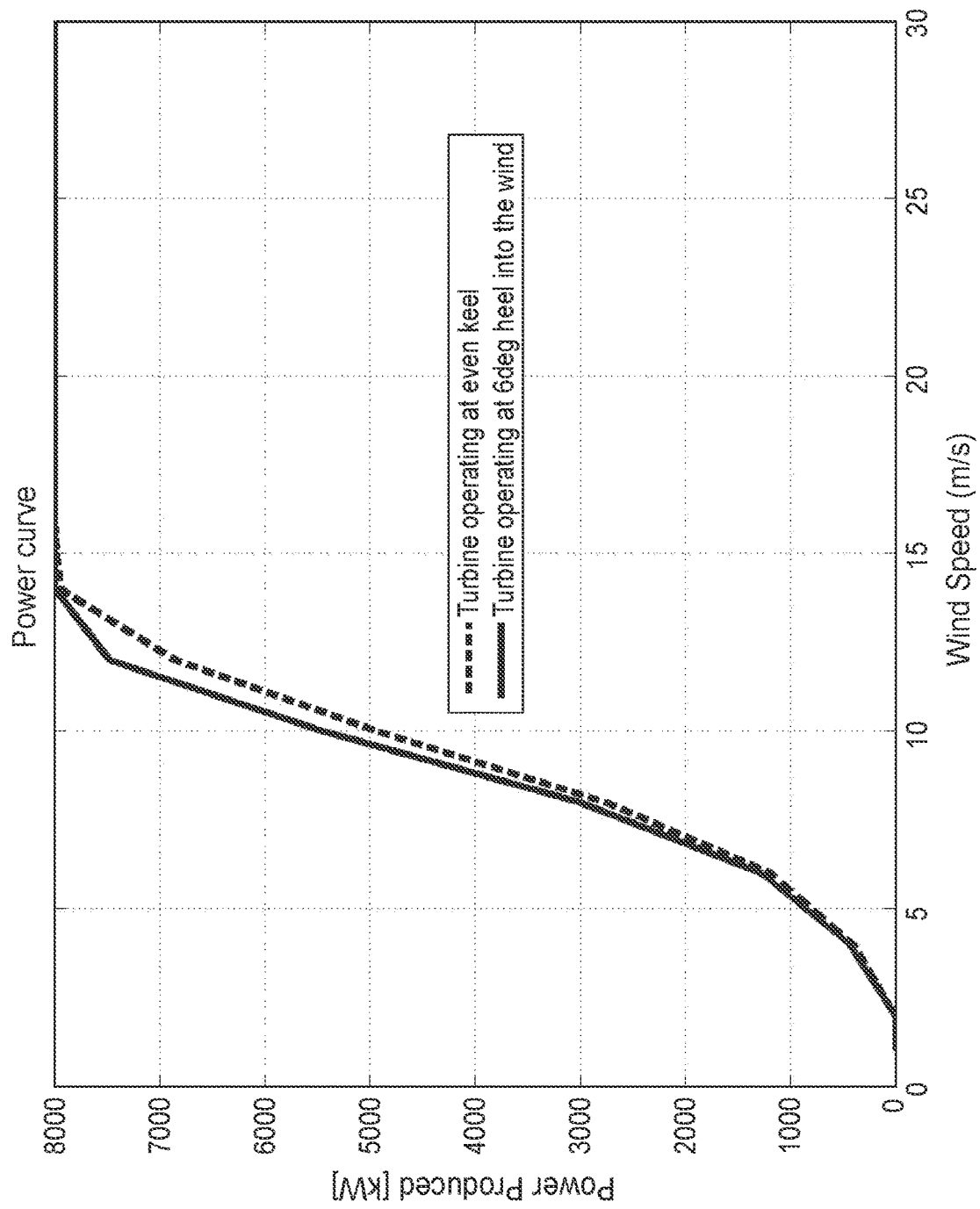
FIG. 6 is a chart illustrating power curves for a generic 8 MW wind turbine operating at even keel and a generic 8 MW wind turbine operating with six degrees of heel into the wind according to an embodiment.

FIG. 6 is a chart illustrating power curves (power produced vs. wind speed) for a generic 8 MW wind turbine operating at even keel (dotted line) and a generic 8 MW wind turbine operating with six degrees of heel into the wind (solid line) according to an embodiment. FIG. 6 shows that optimizing the rotor plane angle enables the turbine to produce more power at smaller wind speeds and therefore increases the efficiency of the HAWT in converting the energy in the available wind into electrical power.

Figure 7:
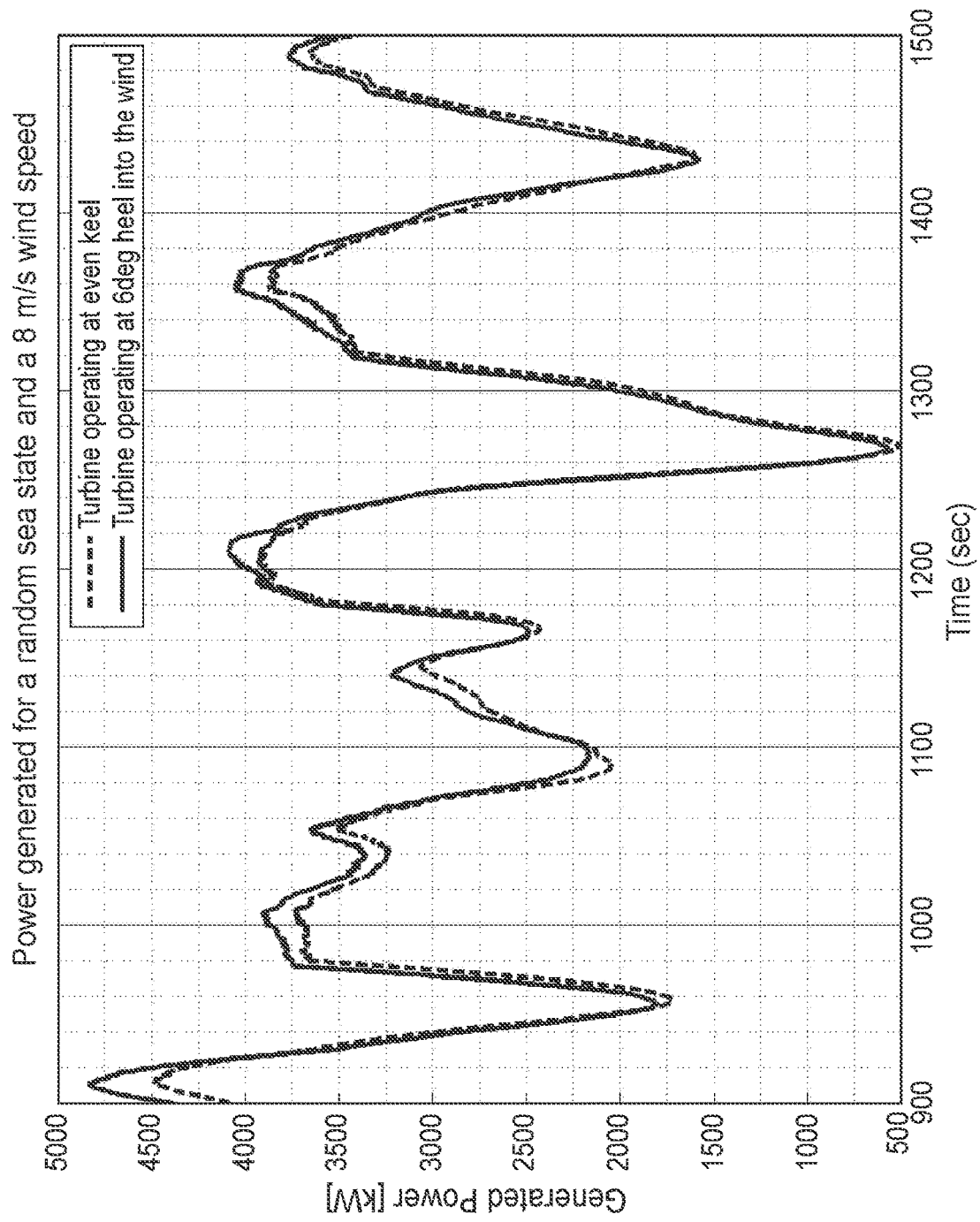
FIG. 7 is a chart illustrating the power produced with a random sea state and less-than rated wind speed (8 m/s) for a generic 8 MW wind turbine operating at even keel and a generic 8 MW wind turbine operating with six degrees of heel into the wind according to an embodiment.

FIG. 7 is a chart illustrating the power produced with a random sea state and less-than rated wind speed (8 m/s) for a generic 8 MW wind turbine operating at even keel and a generic 8 MW wind turbine operating with six degrees of heel into the wind according to an embodiment. FIG. 7 focuses on one wind speed, showing, over time, the potential gain of power obtained by heeling the platform to compensate for ε. In FIG. 7, the power produced at a six-degree angle of inclination (solid line) is consistently higher than when the turbine is operating at even keel (dotted line). Similar predictions should be valid for all HAWTs with an angled rotor.

Figure 8A:
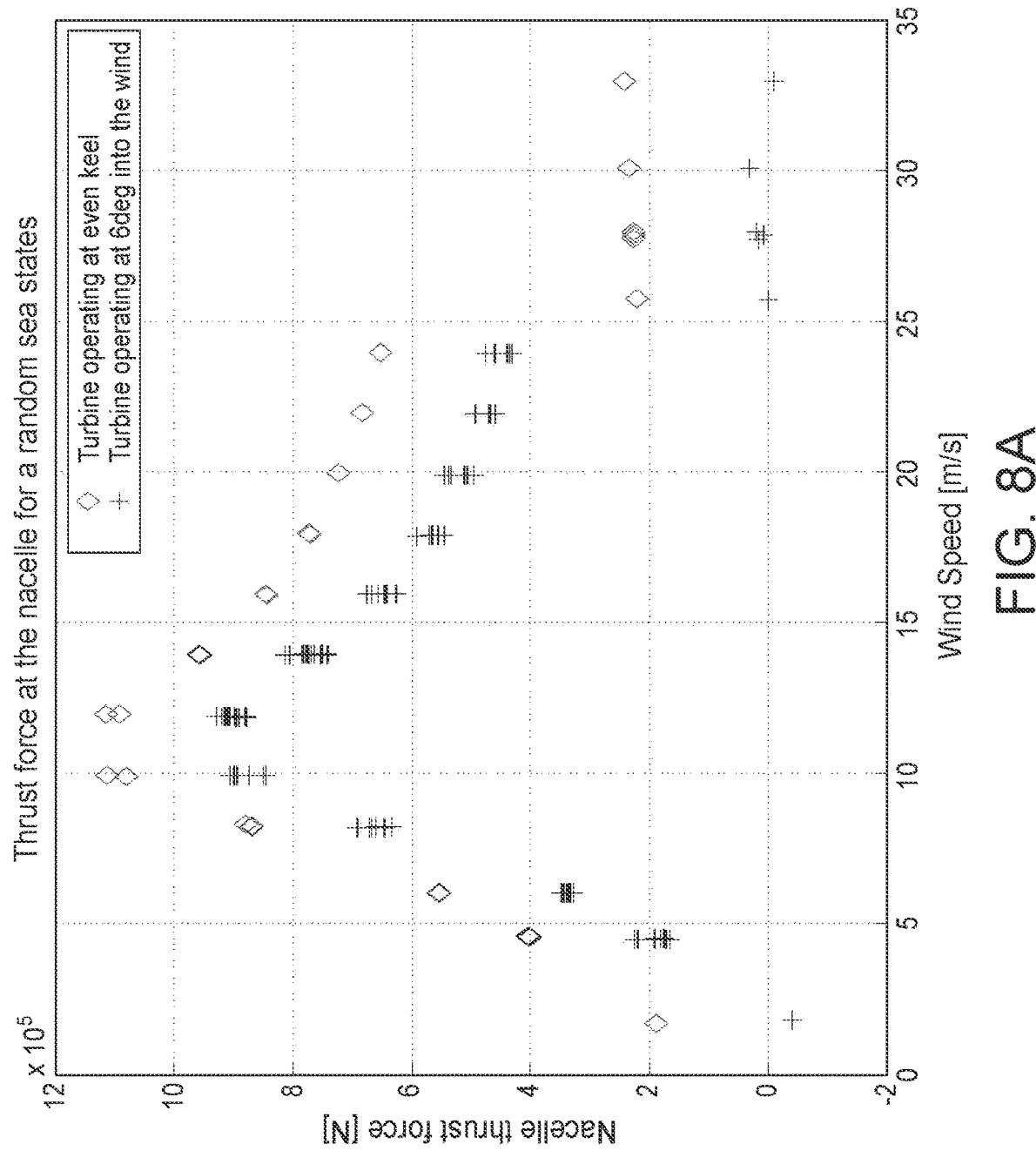
FIG. 8A is a chart illustrating the thrust force at the nacelle vs. wind speed with a random sea state for a generic 8 MW wind turbine operating at even keel and a generic 8 MW wind turbine operating with six degrees of heel into the wind according to an embodiment.

FIG. 8A illustrates the effect of platform inclination on the nacelle thrust force, e.g., the force experienced by RNA 204, 254 in the direction of axes 208, 258 (FIG. 2A, FIG. 2B).

Figure 8B:
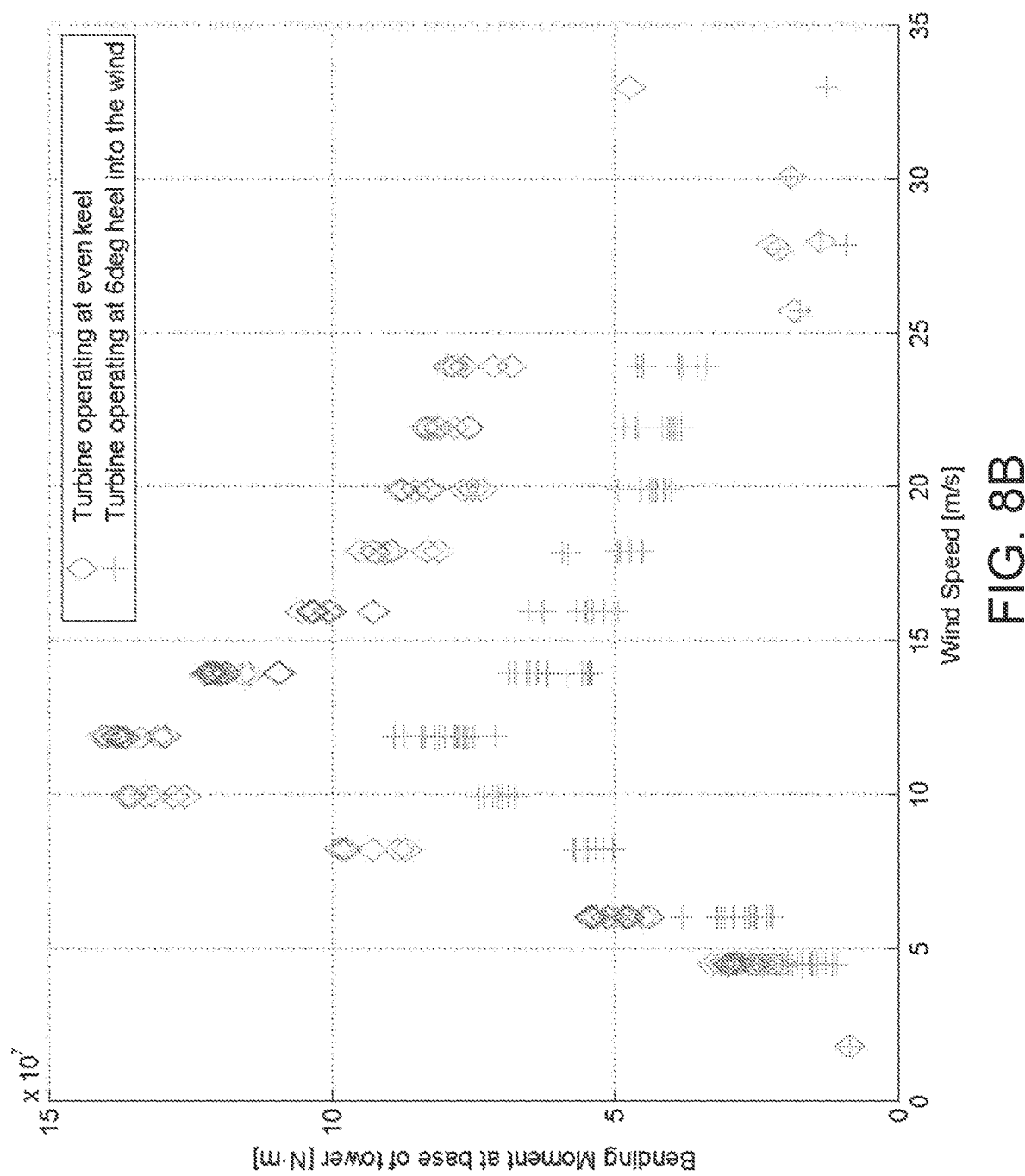
FIG. 8B is a chart illustrating the bending moment at the tower base vs. wind speed with a random sea state for a generic 8 MW wind turbine operating at even keel and a generic 8 MW wind turbine operating with six degrees of heel into the wind according to an embodiment.
Figure 8C:
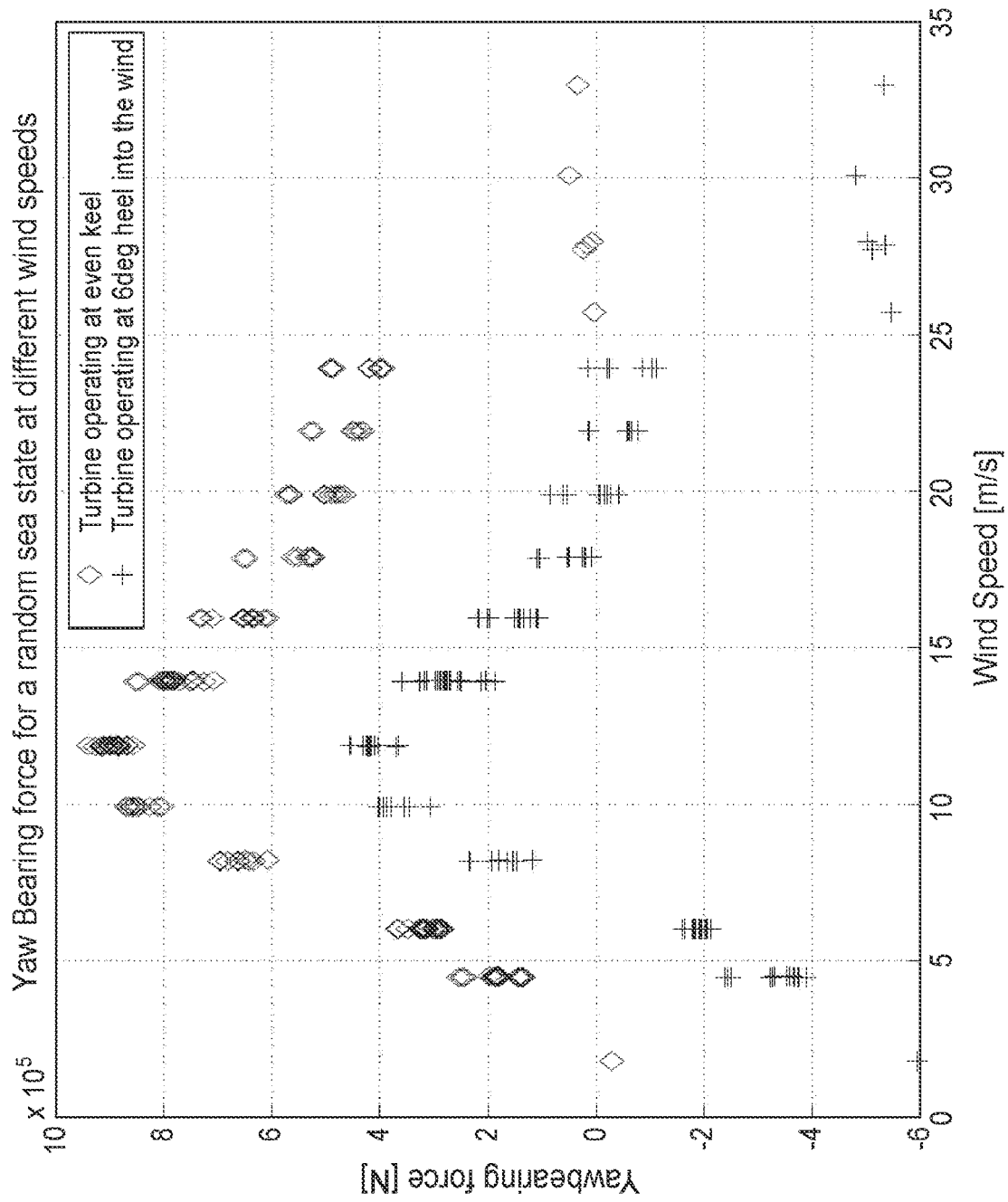
FIG. 8C is a chart illustrating the yaw bearing force vs. wind speed with a random sea state for a generic 8 MW wind turbine operating at even keel and a generic 8 MW wind turbine operating with six degrees of heel into the wind according to an embodiment.

FIG. 8B illustrates the effect of platform inclination on the bending moment experienced at the base the tower, e.g., the bending moment where tower 202, 252 is attached to platform 216, 266 (FIG. 2A, FIG. 2B). FIG. 8C illustrates the effect of platform inclination on the internal yaw bearing force measured perpendicularly to the tower longitudinal axis. In FIG. 8A, FIG. 8B, and FIG. 8C, the effect of platform inclination is illustrated by comparing a generic 8 MW upwind turbine with a 6 degree inclination operating on a floating platform at even keel to the same wind turbine operating on a floating platform inclined 6 degrees into the wind (such that the angle between the rotor plane and vertical is close to zero) for wind speeds varying from 0 m/s to 35 m/s. FIG. 8A shows a significant decrease in the loads at the nacelle when the turbine is heeling towards the wind and the rotor plane is close to the vertical (i.e., a decrease of approximately 20,000 N of thrust force). FIG. 8B shows a significant decrease in the load at the tower base when the turbine is heeling towards the wind and the rotor plane is close to the vertical (i.e., a decrease of approximately 50,000 N of bending moment). And FIG. 8C shows a significant decrease in the yaw bearing load when the turbine is heeling towards the wind and the rotor plane is close to the vertical (i.e., a decrease of approximately 25,000 N of yaw bearing force). This illustrates the multiple benefits of inclining the floating platform: a reduction in loads at both the nacelle and at the base of tower and supporting platform, and an increase in power generation.

In embodiments discussed above, the optimum platform heel angle ($\delta_{optimum}$) is chosen to match closely the fixed rotor plane tilt value such that ε is reduced to zero. In other embodiments, however, the optimum platform heel angle ($\delta_{optimum}$) may be different from the initial value of ε such that ε is not completely eliminated. In such embodiments, the optimum platform heel angle ($\delta_{optimum}$) may be chosen to result in a non-zero ε to account for, for example, various sea-states, wind characteristics, or turbine status. In such embodiments, there may be a number of processes for determining the optimum rotor plane angle: 1) the angle may be determined in advance for a range of conditions using numerical simulations, 2) determined in advance for a range of conditions using machine learning, 3) determined in real-time and directly on the floating wind turbine platform using, e.g., a power-generation feedback loop, and 4) determined first at a second wind turbine platform and subsequently communicated to the first floating wind turbine platform.

In embodiments determining $\delta_{optimum}$ using numerical simulations, the following non-exhaustive list of site characteristics may be considered: environmental characteristics such as wind, wave, current, water depth, or soil data; turbine and platform status such as whether the turbine is producing power, parked, with a fault (from the turbine or active ballast system controller), starting up, or shutting down; platform motions; turbine motions; platform loads; and turbine loads. Such data may be used to develop computational models. Various combinations of the data may be input into the models to find optimum heel angles for the various combinations of data.

Figure 18:
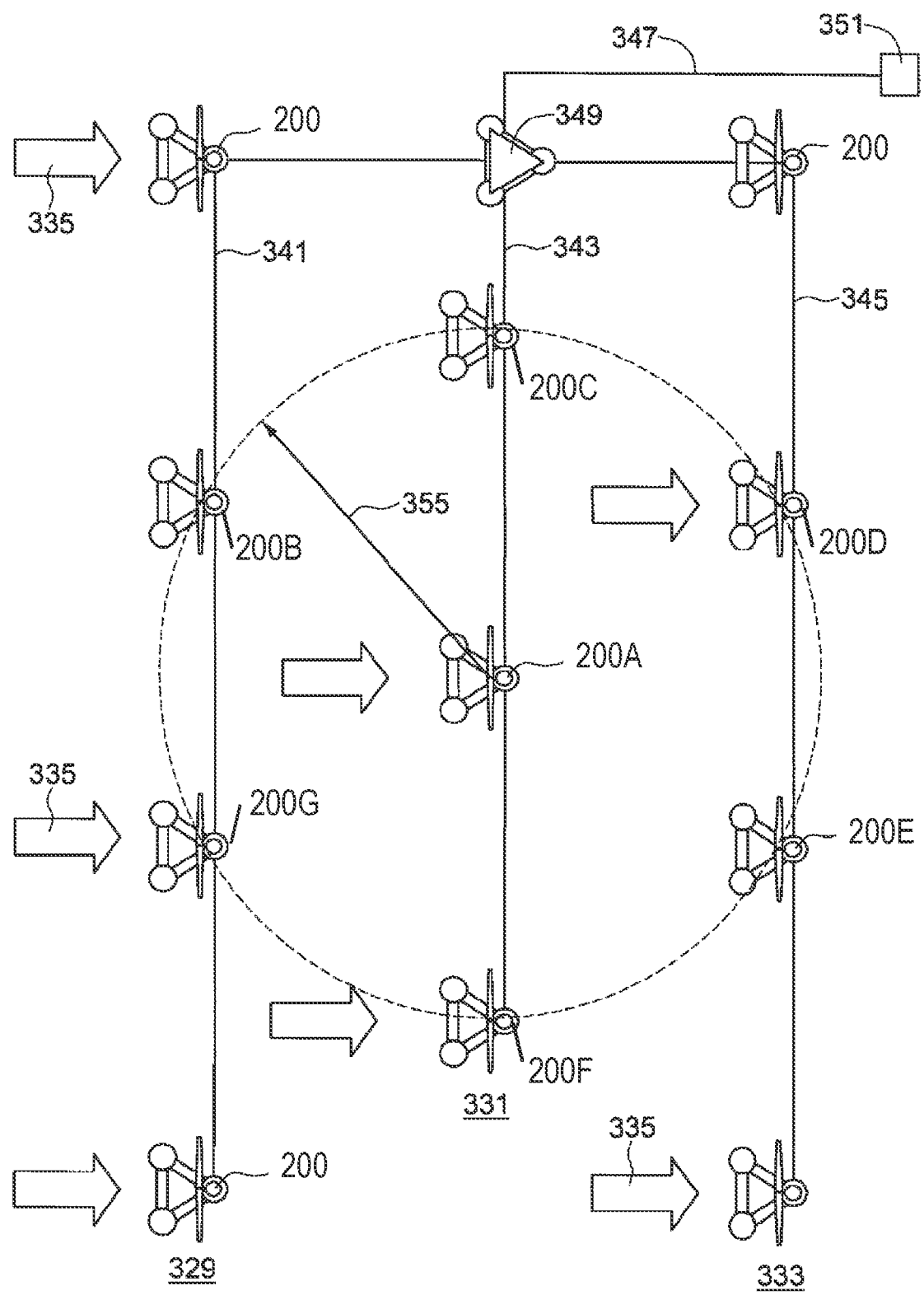
FIG. 18 illustrates an exemplary arrangement of floating wind turbine platform in a wind farm.

In an embodiment, a plurality of floating wind turbines platforms can be arranged in an array. With reference to FIG. 18, an exemplary arrangement (i.e., a "wind farm") of floating wind turbines platforms 200 is illustrated. Since the wind velocity is reduced and made turbulent when it flows through a wind turbine, in one embodiment, the wind turbines are separated by a radius 355 of about 10 wind turbine rotor diameters or more and arranged in multiple staggered lines 329, 331, 333 that are perpendicular to the most frequent wind direction 335. In the illustrated embodiment, the floating wind turbine platforms, e.g. platform 200A, are equally separated from six adjacent wind turbines 200B . . . 200G, by 10 turbine diameters. Because of the staggered configuration, the wind blowing between two floating wind turbines platform 200B, 200G in the first row 329 will have a clear path to the floating wind turbines platforms 200A, 200C, 200F in the second row 331. This wind path will be clear even if the wind direction has shifted up to 30 degrees away from the preferred direction. The floating wind turbines platform 200D, 200E in the third row 333 may be in line with the floating wind turbine platforms 200 in the first row 329, however, since there is a separation of about 17 turbine rotor diameters, the loss of power due to up wind turbulence is negligible. Even if the wind direction shifts to an angle that aligns the adjacent floating wind turbine platforms 200, a 10 turbine rotor diameter separation will only have a minimal effect on power output.

In an embodiment, numerical simulations using such data may also be created for a complete floating wind farm with the simulations providing a $\delta_{optimum}$ for each platform of the wind farm for a given set of conditions. In the embodiment, the $\delta_{optimum}$ may or may not be the same for any two platforms. The embodiments may be used to optimize power production for the wind farm as a whole, which might result in one of more of the platforms in the wind farm producing at less-than-optimum power. Similarly, an embodiment may be used to optimize loading for the wind farm as a whole, which might result in one or more of the platforms in the wind farm experiencing less-than-optimal loading. And, in an embodiment, a wind farm simulation may also provide a prediction for each individual platform of a time at which the platform should expect to begin experiencing the predicted conditions. In an embodiment, information from the simulation may be provided to a controller for an individual platform, which may use that information to time the transfer of ballast so that the platform achieving the optimal inclination (for optimal power or optimal loading or both) coincides with the arrival of the predicted conditions. In an embodiment for determining the $\delta_{optimum}$ for optimizing power or loads or both, a platform controller on a floating wind turbine platform within a wind farm may receive wind speed and direction data. The platform controller, using the wind speed and direction data, may determine a simulation for the windfarm that corresponds to the wind speed and direction data. The platform controller may direct a ballast control system on the platform to achieve the $\delta_{optimum}$ from the corresponding simulation. The platform controller also may provide, to the controllers of the other floating wind turbine platforms of the windfarm, information regarding the corresponding simulation (e.g., the actual simulation or information allowing the other controllers to determine the corresponding simulation). The other controllers then may direct their respective ballast control systems to achieve their respective $\delta_{optimum}$ from the corresponding simulation. In an embodiment, the corresponding simulation may include a time for each platform controller to begin directing their respective ballast control system to achieve their respective the $\delta_{optimum}$. In an embodiment, the corresponding simulation may also include, for each platform, a delay that each platform controller is to wait before directing their respective ballast control system to achieve their respective the $\delta_{optimum}$. In an embodiment, the first platform may controller may determine from the data and the platform's location within the wind farm that the floating wind turbine platform is the first floating wind turbine platform of the wind farm to experience the weather conditions represented by the wind speed and direction data. The first platform controller may include, with the information regarding the corresponding simulation, the time of arrival of the wind conditions such that the delay of each controller is to be measured from the time of arrival. In an embodiment, the corresponding simulation may be chosen from a database of simulations, or may be computed by each platform controller based on the received data.

In an embodiment, a wind farm will have floating wind turbine platforms at the periphery of the wind farm. Depending on the direction of oncoming weather conditions, one or more of the peripheral platforms will experience the oncoming weather conditions before the remainder of the platforms in the wind farm. In the embodiment, a platform controller may, from data it receives from wind direction sensors, determine that it is the initial platform of the wind farm to experience such oncoming weather condition. The initial platform may then, from sensor data regarding the conditions it is experiencing, determine the numerical solution that is appropriate for the wind farm and communicate that information to the remainder of the wind farm. The other controllers then may direct their respective ballast control systems to achieve their respective $\delta_{optimum}$ from the corresponding simulation.

In an embodiment, a first floating wind turbine platform may send its current weather conditions to one or more other floating wind turbine platforms, e.g., by the first floating wind turbine platform sending such weather condition data to networked platform controllers on floating wind turbine platforms within the same wind farm. In response, the first floating wind turbine platform may receive one or more optimum platform heel angles ($\delta_{optimum}$) from one or more of the other floating wind turbine platforms. In the embodiment, the received optimum platform heel angles may be chosen by the other platform(s) based on a comparison of the weather conditions from the first floating wind turbine platform to present or past weather conditions at the other platform(s), with the other platforms providing the $\delta_{optimum}$ heel angle that platform developed for the weather conditions that most closely matched the weather conditions at the first floating wind turbine platform. In the embodiment, along with the received $\delta_{optimum}$ heel angles, the first floating wind turbine platform may also receive the associated weather conditions from the other platform, allowing the first floating wind turbine platform to choose from among the received $\delta_{optimum}$ heel angles based on which was developed in response to weather conditions that most closely match the weather conditions at the first floating wind turbine platform. In other words, in an embodiment, the $\delta_{optimum}$ heel angle (or "vertical target angle") may be transmitted by another platform in the wind farm which experienced or is experiencing the same conditions and already performed the optimization.

Figure 9:
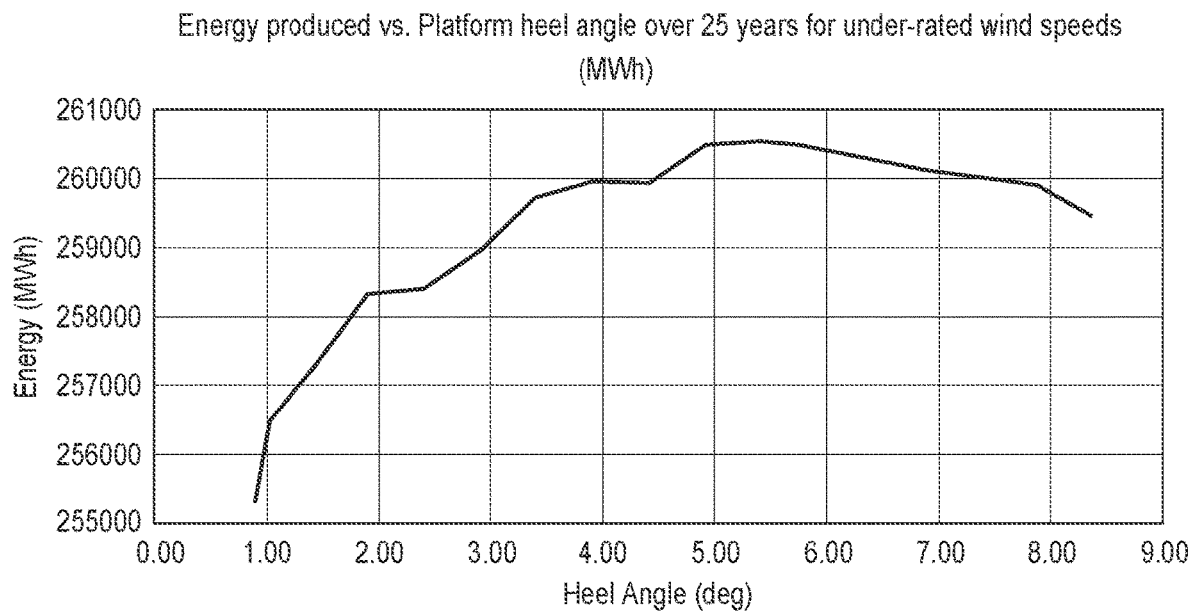
FIG. 9 is a chart illustrating an example of a determination of optimum heel angle for a generic 8 MW floating wind turbine with a random sea state and less-than-rated wind speeds over a twenty-five-year period according to an embodiment.

FIG. 9 illustrates the determination of $\delta_{optimum}$ using a numerical simulation. FIG. 9 is a chart illustrating an example of a determination of optimum heel angle for a generic 8 MW floating wind turbine with a random sea state and less-than rated wind speeds over a twenty-five-year period according to an embodiment. In FIG. 9 the computational model was developed using one defined sea state (random), a standard wind profile, and a fixed offset angle, e.g., fixed offset angle 214, 264, of six degrees. FIG. 9 shows the power production for the total time the wind speed of the standard wind profile was at a less-than-rated wind speed for the 8 MW wind turbine. In this example, determining $\delta_{optimum}$ is approximately 5.4 degrees, which is 10% less than the fixed offset angle. The determined $\delta_{optimum}$ of 5.4 degrees can then be transmitted to the active ballast controller when the actual wind speed and sea state match the model via various feed-forward schemes. One feed-forward scheme includes a lookup table which gives the optimum angle for a given set of parameters (e.g., the sea state and wind speed of FIG. 9, or a set of parameters including sea state, wind direction, and wind speed) with the different optimum angles pre-defined for various combinations of the parameters in the set. A second feed-forward scheme includes an analytical function which finds the optimum heel angle $\delta_{optimum}$ depending on the input parameters.

FIG. 9 further illustrates that the actual platform heel angle need not exactly match the determined $\delta_{optimum}$ heel angle for an embodiment to be effective. In other words, the error between the determined heel angle and the actual heel angle need not be zero for the inclination of the platform to provide improved power production. In FIG. 9 a maximum of approximately 260,500 MWhr are produced at the heel angle of 5.4 degrees. However, 99% of that value (or 257,900 MWhr) is produced for induced platform heel angles of approximately 1.7 degrees and above. That 1.7 degrees is roughly 30% of the 5.4 degrees at which the maximum energy was produced, and is similarly roughly 30% of the fixed offset angle of 6 degrees. Considering that 99% of the benefit of inducing a platform heel angle may be achieved at only 30% of the determined $\delta_{optimum}$ heel angle, in an embodiment it may be sufficient to achieve the determined $\delta_{optimum}$ heel angle plus or minus 70% of the determined heel angle. Thus, with regard to FIG. 9 and a determined $\delta_{optimum}$ heel angle of 5.4 degrees, resulting induced platform angles of from 1.6 degrees to 9.2 degrees may be sufficiently close to the determined $\delta_{optimum}$ heel angle to be acceptable. In an embodiment, an acceptable platform heel angle may be based on a range of angles that return 95% of the benefit of the determined $\delta_{optimum}$ heel angle. In an embodiment, an acceptable platform heel angle may be based on a range of angles that return 90% of the benefit of the determined $\delta_{optimum}$ heel angle.

FIG. 9 also further illustrates that inclining the platform to make the rotor plane more perpendicular to the wind direction at under-rated wind speeds provides improved power production any inclination greater than zero.

Waves, water depth, and current do not change the mean or angular position of the platform. This means that the optimum heel angle is independent from the sea-state. However, the sea-state has an effect on the dynamics of the platform and turbine. A high sea-state combined with a non-zero mean position (when heeling into the wind) could lead to motions that could be out of its limitations.

In embodiments determining $\delta_{optimum}$ in real time, the data from sensors in the active ballast controller system (e.g., inclination-determining sensors, wind speed and direction sensors, power production-determining sensors, and load sensors (e.g., tower load sensors—sensors measuring the stress at desired locations on the platform and tower (e.g., bending moment along the tower, or at the tower base) using, e.g., strain gauges)) or in the turbine controller system (e.g., power production-determining sensors, thrust load sensors), or in such systems from other platforms (e.g., a second platform from the same wind farm), or in related systems (e.g., power substations), or in a combination of such sources may be used. The data may be used by the active ballast controller through feedbacks schemes. Indeed, when optimally controlled, the power from the system may be tracked and controlled and the active ballast controller can continuously vary the heel angle in order to optimize the power. For example, in an embodiment, power may be optimized by modifying the heel angle. In the embodiment, the platform inclination may be varied using various control algorithms (e.g., PID, Kalman filter, etc.) and the effect on power generation determined.

In an embodiment, data may be communicated between floating wind turbine platforms within a wind farm of two or more floating wind turbines or, more simply, between two more floating wind turbines that are situated such that the conditions experienced by one platform may be informative of or anticipate the conditions experienced by another platform. In the embodiment, power or loading or both may be optimized on a first platform by modifying the heel angle and that optimization information may be transmitted to one or more of the other platforms. The platforms receiving the optimization information may include all associated platforms, or may be limited by, e.g., those determined to be likely to experience the same conditions (e.g., wind speed, wind direction, sea conditions) as the optimized platform. The receiving platform may then implement the optimized heel angle immediately, or with a timing delay to achieve the optimized heel angle when the conditions associated with the optimized heel angle are expected to arrive. The receipt of the optimized heel angle information from the initial platform may reduce or eliminate the time required for the receiving platform to achieve an optimized heel angle. For example, upon the receiving platform achieving the optimized heel angle, subsequent feedback control may indicate that the received optimized heel angle was, in fact, the optimal heel angle for the receiving platform. However, the subsequent feedback control may also indicate that the received optimized heel angle was, in fact, not optimal for the receiving platform, in which case the feedback control correctly optimizes the heel angle for the receiving platform. In either case, the receiving platform may benefit from receiving the initial optimized heel angle by reducing the time required for the receiving platform for determining its own customized, optimized heel angle. The time may be reduced because the platform may have only to either confirm that the received angle was in fact optimal, or to slightly modify the received angle to customize it for the receiving platform.

In an embodiment, a machine learning based algorithm combining local and remote information may be used to optimize, for each platform in the related area, a $\delta_{optimum}$ for each platform and optimization time of each optimum heel angle for a set of weather conditions. For example, for a wind farm, data may be gathered on weather and sea conditions experienced for each of the platforms and the timing of how such conditions permeated through the wind farm, i.e., the timing and sequence of platforms that experience a weather change and how the weather conditions experienced by the individual platforms is affected by permeating through the wind farm. Associated data may also be gathered on the optimized heel angles (i.e., angle and direction) and timing for each of the platforms. Sets of such data may be fed to machine learning-based algorithms to determine optimized heel angles for each platform in the wind farm, the timing such optimized angles should be achieved, based on an initial set of conditions. In the embodiment, the $\delta_{optimum}$ may or may not be the same for any two platforms. The embodiment may be used to optimize power production for the wind farm as a whole, which might result in one of more of the platforms in the wind farm producing at less-than-optimum power. Similarly, an embodiment may be used to optimize loading for the wind farm as a whole, which might result in one or more of the platforms in the wind farm experiencing less-than-optimal loading. And, in an embodiment that provides a prediction for each individual platform of a time at which the platform should expect to begin experiencing the predicted conditions, information may be provided to a controller for an individual platform, which may use that information to time the transfer of ballast so that the achieving of the optimal inclination (for optimal power or optimal loading or both) coincides with the arrival of the predicted conditions.

In an embodiment, a wind farm will have floating wind turbine platforms at the periphery of the wind farm. Depending on the direction of oncoming weather conditions, one or more of the peripheral platforms will experience the oncoming weather conditions before the remainder of the platforms in the wind farm. In the embodiment, a platform controller may, from data it receives from wind direction sensors combined with data indicating the platform's position relative to other platforms of the windfarm, determine that it is the initial platform of the wind farm to experience such oncoming weather condition. The initial platform may then, from sensor data regarding the initial set of conditions that the platform is experiencing, determine the machine learning based solution that is appropriate for the wind farm and communicate that solution to the remainder of the wind farm. In an embodiment, the initial platform communicates the conditions to the remainder of the wind farm and each other platform of the wind farm then determines the appropriate machine learning based solution for that set of initial conditions.

Figure 10:
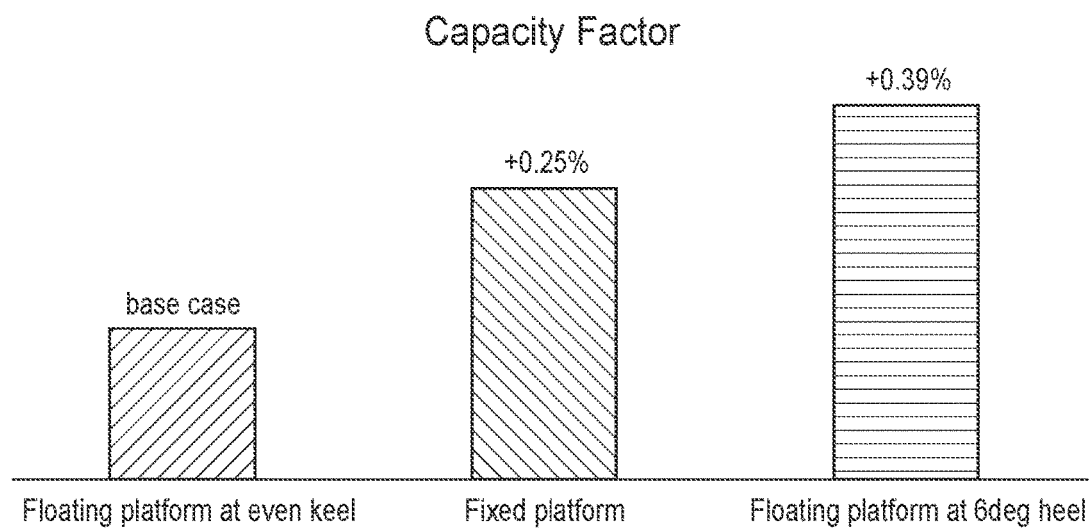
FIG. 10 is a chart illustrating capacity factors for a generic 8 MW fixed bottom wind turbine, a generic 8 MW floating wind turbine at even keel, and a generic 8 MW floating wind turbine at an optimum heel angle into the wind according to an embodiment.

FIG. 10 is a chart illustrating capacity factors for a generic 8 MW fixed bottom wind turbine, a generic 8 MW floating wind turbine at even keel, and a generic 8 MW floating wind turbine at an optimum heel angle into the wind according to an embodiment. The capacity factor is the real power produced by a turbine during 25 years divided by the power produced during 25 years if the turbine were always producing its maximum power. Comparing capacity factors provides a prediction of the increase in power production over the turbine lifetime when the platform is inclined to compensate for ε. In FIG. 10, the base case is a floating platform at even keel. In comparison, the capacity factor of a fixed platform shows a 0.25% increase, and the capacity factor of a floating platform at six degrees of heel shows a 0.39% increase. Thus, FIG. 10 shows that not only does heeling the turbine improve power production compared to a floating at even keel turbine, but it also improves power production compared to that of a fixed-bottom turbine. Therefore, the ability of floating platforms with active ballast systems to change their heel angle allow for an increase in power production compared over that produced by wind turbines on fixed foundations. In other words, the increase in power production of the floating system over that of the fixed system means that the floating system may be more efficient in extracting power from the available wind energy than a fixed system, even in systems where the actual wind turbines used are the same. Thus, the control of the platform inclination can have a positive impact on turbine power production, loading, or both, without having to modify or interface with the turbine in any way.

In an embodiment, the various system controllers, e.g., an active ballast controller and a turbine controller, may be separate controllers. For example, the turbine controller may be located in the turbine nacelle or tower and the active ballast controller may be located elsewhere on the floating platform with the two in communication for the purposes of, e.g., exchanging data (e.g., wind speed, wind direction, and platform inclination) and commands (e.g., emergency shut down commands).

In an embodiment, an exchange of data between controllers, e.g., between the active ballast controller and the turbine controller, may instead be replaced by a command from one controller to the other. For example, when the active ballast controller detects that the inclination of the platform is beyond a threshold level, the active ballast controller may command the turbine controller to shut down or otherwise de-power the turbine. Similarly, when the wind turbine is stopped and the turbine controller detects that the wind speed is, or soon will be, sufficient to power the wind turbine, the turbine controller may command the active ballast controller to incline the platform to a certain degree (e.g., $\delta_{optimum}$).

In an embodiment, the functions of the active ballast controller and the turbine controller may be integrated into a single "global platform" controller, such that data received by the integrated controller is accessible by aspects of the integrated controller responsible for controlling the ballast distribution and accessible by aspects of the integrated controller responsible for controlling the wind turbine. In such an embodiment, data is generally available for the global controller to use as needed, i.e., data is not sent from one aspect of the integrated controller to the other. In other words, aspects of the integrated controller software responsible for controlling the wind turbine need not send wind direction and wind speed data to aspects of the integrated controller software responsible for ballast distribution.

In an embodiment, active ballast controllers on each floating platform may exchange data (for example environmental sensors such as wind speed, wind direction, wave height and period, platform heel angle, power produced, stress at the base of tower or on specific locations of the platform) in order to optimize the power and minimize the loads. This exchange allows the platform active ballast controller to predict the environmental conditions the platform is likely to encounter in the near future and to predict the optimum heel angle which corresponds to these conditions. In addition, the receipt of an optimized heel angle information from an initial platform may reduce or eliminate the time required for the receiving platform to achieve an optimized heel angle, as discussed earlier.

In an embodiment, integrated controllers on each floating platform may exchange data (for example environmental sensors such as wind speed, wind direction, wave height and period, platform heel angle, power produced, stress at the base of tower or on specific locations of the platform) in order to optimize the power and minimize the loads. This exchange allows the platform integrated controller to predict the environmental conditions the platform will encounter in the near future and to predict the optimum heel angle which corresponds to these conditions. In addition, the receipt of an optimized heel angle information from an initial platform may reduce or eliminate the time required for the receiving platform to achieve an optimized heel angle, as discussed earlier.

In an embodiment, an active ballast system includes pumps and piping that move the ballast, e.g., water, between columns. Using data from sensors (e.g., acceleration sensors, inclination sensors, or both) the controller (e.g., a logic board including one or more processors, memory, and instruction incorporated therein) drives the ballast pumps to set or maintain the desired inclination angle. The pumps may be driven occasionally, e.g., the controller may turn on the pumps on average a few times per day, in order to avoid pump fatigue and excessive energy expenditures on the platform. This limited driving of the pumps may occur despite considerable dynamic changes to the platform inclination angle due to wind and wave disturbances.

In an embodiment, to attain the desired inclination (e.g., $\delta_{optimum}$), the controller determines the optimal heel angle of the platform and adjusts the platform ballast to cause the platform to attain the optimal heel angle, as described. As described in U.S. patent application Ser. Nos. 12/988,121 and 14/283,051, the marine system controller controls ballast water contained inside the three columns of the hull that can be moved from column to column in order to maintain the low-frequency platform angular motions around a pre-defined equilibrium angle. U.S. patent application Ser. Nos. 12/988,121 and 14/283,051 focus on the methodology to maintain a wind turbine vertical on a floating platform. In comparison, the instant application describes finding a platform heel angle that optimizes power production, reduces loads, or both. Such changes to platform heel angle are achievable provided the floating platform is equipped with an active ballast system, aspects of which will now be described in further detail.

In an embodiment, data communicated between active ballast controllers and integrated controllers present in a wind farm allows a controller on a particular platform to predict the future site conditions on that platform and allows the controller to time a pre-ballast so that the platform is at the optimized heel angle upon the arriving of the anticipated conditions. In an embodiment, the pre-ballast may be timed so that the platform achieves the optimized heel angle at a time coinciding with the arrival of the anticipated conditions. Such a pre-ballasting embodiment may reduce the time between the arrival of the anticipated conditions and the time the optimized heel angle is achieved. A machine learning based algorithm combining local and remote information, as described above, may also be used to optimize the platform heel angle and optimization time of each optimum heel angle. In an embodiment, data communicated between active ballast controllers and integrated controllers present in a wind farm may allow a controller on a particular platform to predict the future site conditions on that platform and optimize the heel angle, where the optimal heel angle is determined by considering the energy gained by heeling into the wind versus the energy used by the active ballast pumps. For example, in a site where the wind direction or speed is changing rapidly, a controller may decide to heel less into the wind order to be prepared for sudden wind characteristic changes. A machine learning based algorithm combining local and remote information, as described above, may also be used to optimize the platform heel angle and optimization time of each optimum heel angle.

Figure 11A:
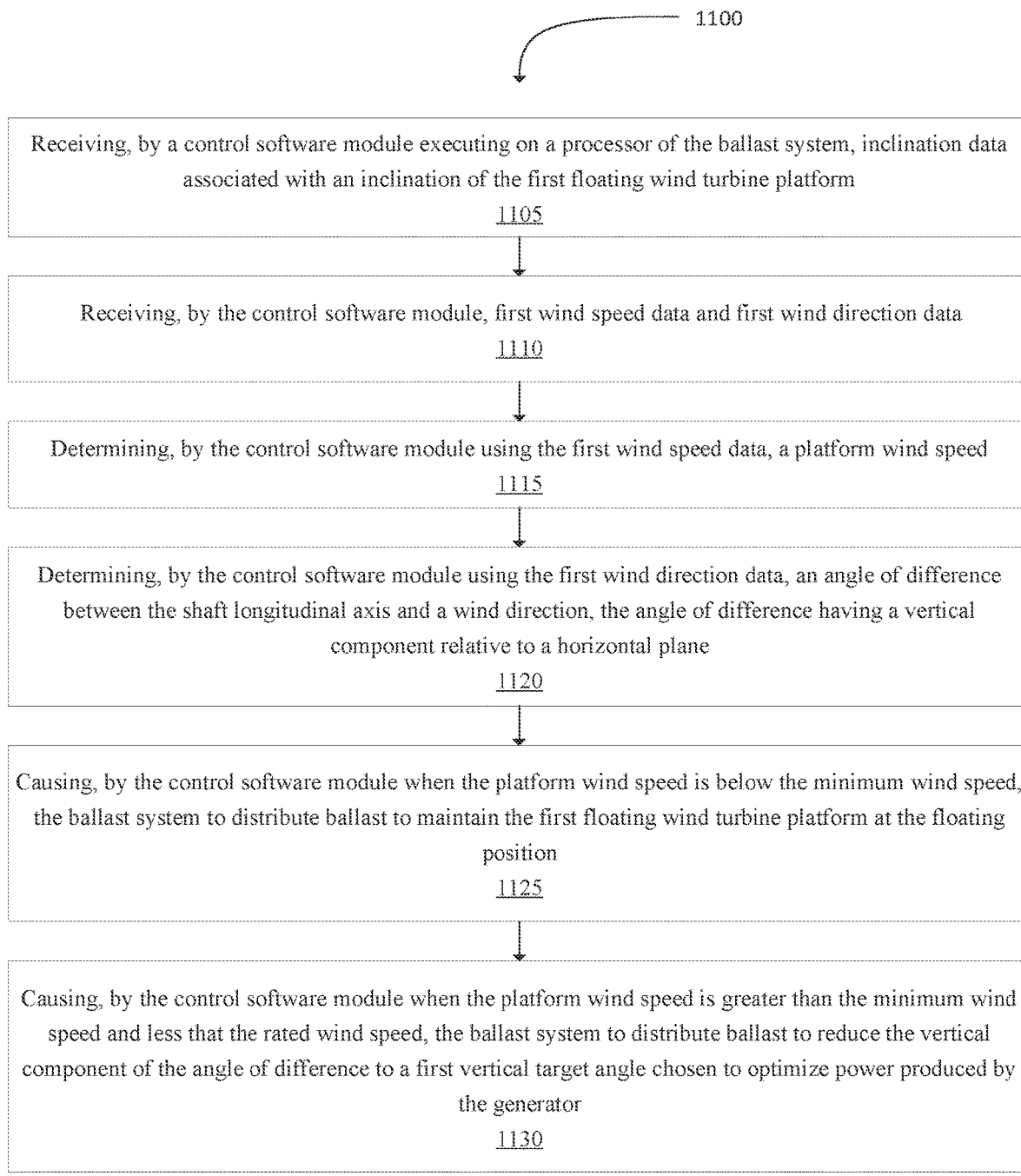
FIG. 11A is a flowchart of an embodiment of a method.

FIG. 11A is a flow chart of an embodiment of a method 1100 for controlling an inclination of a first floating wind turbine platform to optimize power production. In FIG. 11A, the floating wind turbine platform may include: a generator connected to a shaft having a shaft longitudinal axis; a set of turbine blades connected to the shaft and defining a blade plane that is perpendicular to the shaft longitudinal axis; a tower having a tower longitudinal axis, the shaft being connected to the tower such that there is a non-zero angle between the blade plane and the tower longitudinal axis; at least three stabilizing columns, each of the at least three stabilizing columns having an internal volume for containing ballast; and a ballast system for distributing ballast, the first floating wind turbine platform having a rated wind speed, a minimum wind speed, and a floating position in which the tower longitudinal axis is vertical. In method 1100, in step 1105, a control software module executing on a processor of the ballast system receives inclination data associated with an inclination of the first floating wind turbine platform. In step 1110, the control software module receives first wind speed data and first wind direction data. In step 1115, the control software module determines a platform wind speed using the first wind speed data. In step 1120, the control software module determines, using the first wind direction data, an angle of difference between the shaft longitudinal axis and a wind direction, the angle of difference having a vertical component relative to a horizontal plane. In step 1125, when the platform wind speed is below the minimum wind speed, the control software module causes the ballast system to distribute ballast to maintain the first floating wind turbine platform at the floating position. And in step 1130, when the platform wind speed is greater than the minimum wind speed and less that the rated wind speed, the control software module causes the ballast system to distribute ballast to reduce the vertical component of the angle of difference to a first vertical target angle chosen to optimize power produced by the generator.

Figure 11B:
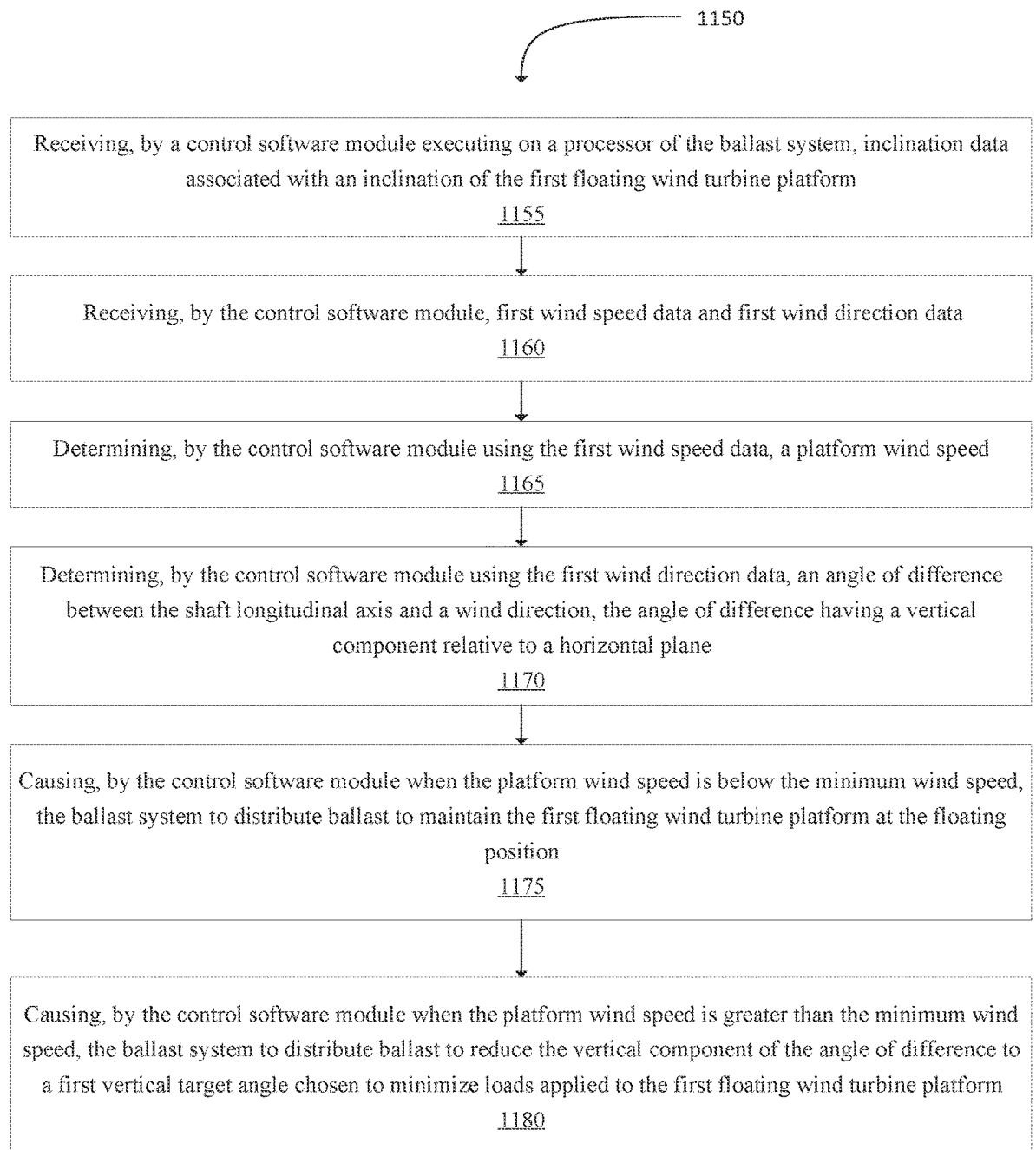
FIG. 11B is a flowchart of an embodiment of a method.

FIG. 11B is a flow chart of an embodiment of a method 1150 for controlling an inclination of a first floating wind turbine platform to optimize power production. In FIG. 11B, the floating wind turbine platform may include: a generator connected to a shaft having a shaft longitudinal axis; a set of turbine blades connected to the shaft and defining a blade plane that is perpendicular to the shaft longitudinal axis; a tower having a tower longitudinal axis, the shaft being connected to the tower such that there is a non-zero angle between the blade plane and the tower longitudinal axis; at least three stabilizing columns, each of the at least three stabilizing columns having an internal volume for containing ballast; and a ballast system for distributing ballast, the first floating wind turbine platform having a rated wind speed, a minimum wind speed, and a floating position in which the tower longitudinal axis is vertical. In method 1150, in step 1155, a control software module executing on a processor of the ballast system receives inclination data associated with an inclination of the first floating wind turbine platform. In step 1160, the control software module receives first wind speed data and first wind direction data. In step 1165, the control software module determines a platform wind speed using the first wind speed data. In step 1170, the control software module determines, using the first wind direction data, an angle of difference between the shaft longitudinal axis and a wind direction, the angle of difference having a vertical component relative to a horizontal plane. In step 1175, when the platform wind speed is below the minimum wind speed, the control software module causes the ballast system to distribute ballast to maintain the first floating wind turbine platform at the floating position. And in step 1180, when the platform wind speed is greater than the minimum wind speed, the control software module causes the ballast system to distribute ballast to reduce the vertical component of the angle of difference to a first vertical target angle chosen to optimize power produced by the generator.

Figure 12:
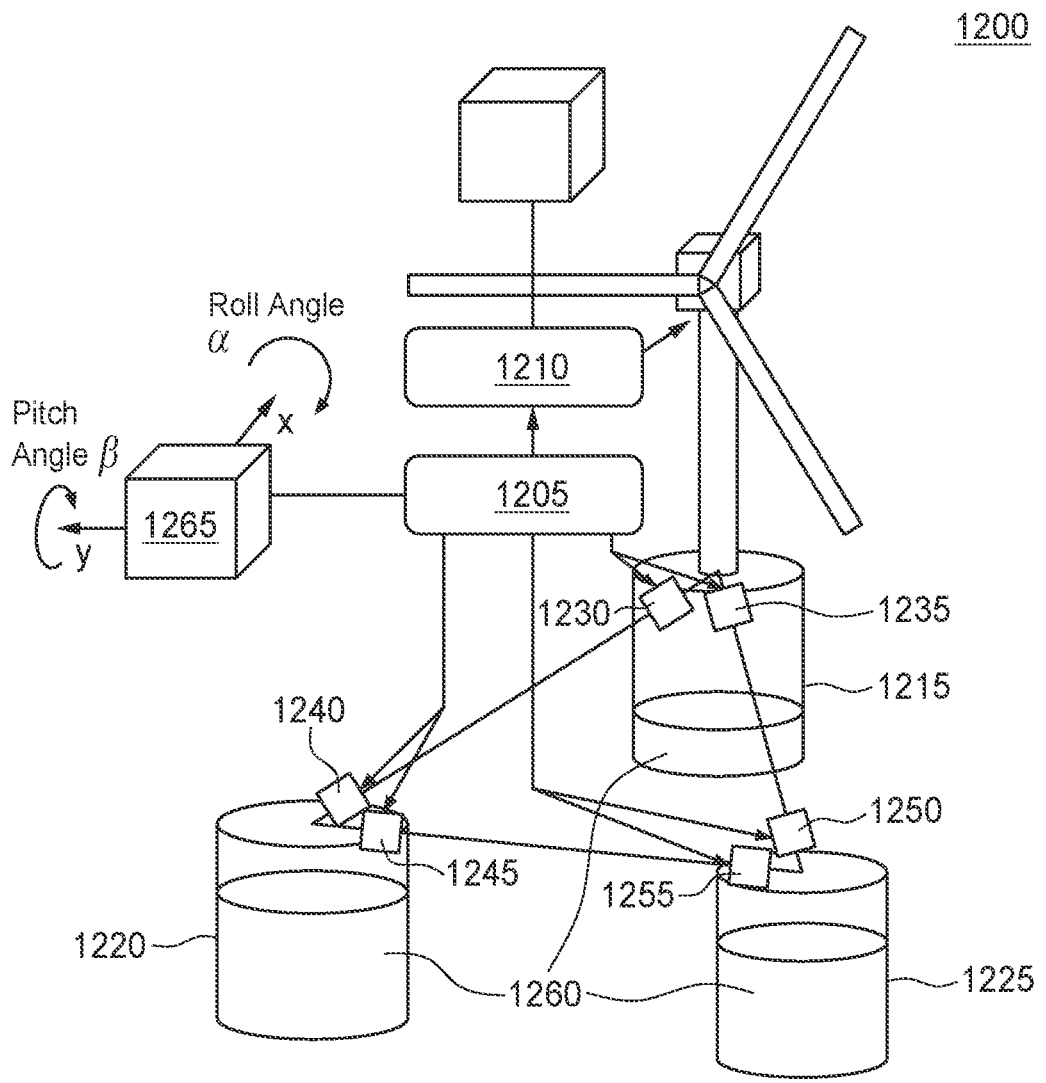
FIG. 12 shows a floating wind turbine platform with decoupled marine system and wind turbine controllers according to an embodiment.

FIG. 12 shows a floating wind turbine platform 1200 with decoupled marine system 1205 and wind turbine controllers 1210. For more redundancy and for a more efficient system, two pumps can be installed at each of the first column 1215, second column 1220, and third column 1225, which would bring the total number of pumps for the system to six pumps (1230, 1235, 1240, 1245, 1250, and 1255). Each of the six pumps may transfer ballast 1260 from the column at which the pump resides to the column to which the pump is connected.

For example, the first column 1215 has two pumps: pump 1230 and pump 1235. The pumps work on an on-and-off basis. They are switched on only occasionally, e.g., when the wind speed or direction changes significantly, to attain the desired platform inclination. The controller is optimally set to turn on the pumps on average a few times per day, despite considerable dynamics due to wind and wave disturbance, in order to avoid pump fatigue and excessive energy expenditures on the platform.

The platform is fitted with motion sensors 1265 to measure the platform angular motions that can be used as input signals for the marine system controller. Accelerometers or inclinometers may be composed of a simple moving mass mounted on springs that track gravity. They both sense the acceleration due to the rotation of the platform, but also due to the linear accelerations—in surge, sway, and heave.

As far as this marine system controller is concerned, both a bi-axial pitch-and-roll inclinometer or a bi-axial surge-and-sway accelerometer are acceptable since linear accelerations (surge and sway) can be transformed to angular motions (pitch and roll). Both sensors are acceptable so long they track the gravity component of the platform, which is similar to the low-frequency angular motions. These motions sensors can be installed at any location on the platform. Usually for redundancy again, several motion sensors are installed in different columns and their measurement outputs are compared at all times before being fed into the control loop.

Figure 14:
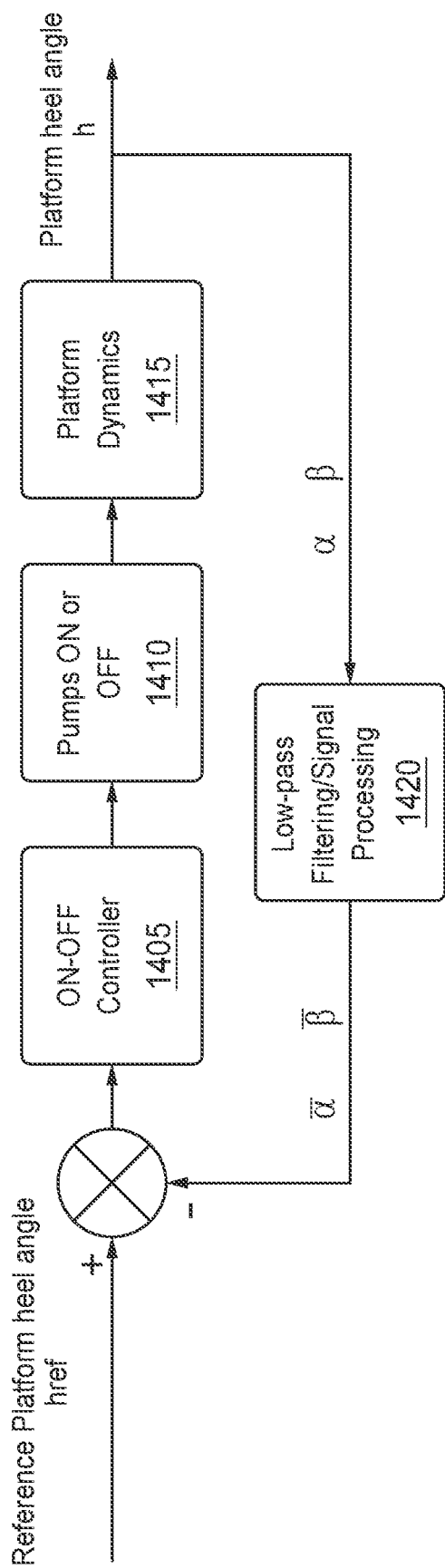
FIG. 14 is a flow chart for the control of a floating platform according to an embodiment.

FIG. 14 is a flow chart for controlling a floating platform according to an embodiment. In FIG. 14, the platform roll angle ($\alpha$) and pitch angle ($\beta$) signals are provided by the platform sensors and input to the controller. In an embodiment, the measured roll and pitch angle signals are low-pass filtered ($\bar{\alpha}$ and $\bar{\beta}$) to remove high-frequency disturbances, such as, e.g., those resulting from the wave and wind dynamic and stochastic effects. In an embodiment, the platform roll and pitch angles are low-pass filtered by a signal processing 1420 using standard low-pass filtering strategies such as high-order Butterworth filters. In an embodiment, the filtering may be performed in advance of the controller receiving the signals. And in an embodiment, the filtering may be performed by software or hardware components of the controller itself.

FIG. 14 shows the logic behind the feedback controller. The filtered platform roll and pitch angles, $\bar{\alpha}$ and $\bar{\beta}$, are input signals to the controller at 1405, provided by the platform sensors. Firstly, the measured signals are low-pass filtered at 1420 as discussed. Based on the filtered platform pitch and roll angles, $\bar{\alpha}$ and $\bar{\beta}$, the relative angles $\theta_{i-j}$ between column top centers i and j, are derived using Equations 6A, 6B, 6C for a platform with columns at the vertices of an isosceles or equilateral triangle.

The following convention is used. If $\theta_{i-j}$ is positive, it means that column i is higher than column j. The error determined using Equation 7 is the error used as an input of the controller. Based on the sign of the error, $e_{i-j}$, the correct pump $P_{i-j}$ will be turned on at 410 provided that $e_{i-j}$ is greater than a certain value that defines the dead-band for ON. The pumps $P_{i-j}$ or $P_{j-i}$ will be switched off provided that $e_{i-j}$ is less than a certain value that defines the dead-band for OFF. Depending on the relative angles $\theta_{i-j}$, one, two, or three pumps will be on. With this algorithm based on the relative angles between column top centers, the fastest water transfer path is always considered, thus the platform attains the desired angle very quickly or as fast as possible in every situation. Automatic bypass is also functioning with that approach, if one pump is suddenly deficient. The platform dynamics are measured, including its roll and pitch angles, $\alpha$ and $\beta$, at 1415 and used to provide a heel angle measurement fed back into the feedback loop.

A standard Proportional-Integral-Derivative (PID) controller could also be used in the determination of based on the heel angle error, but a simple on-off controller preceded by a filtered signal can be sufficient, due to the high capacitance of the system.

The wind turbine controller includes a number of instruments, a number of actuators, and a computer system (or a microprocessor) able to process the signals input by the instruments and communicate these signals to the actuators. The main objective of the wind turbine controller is the maximization or generation of the power production and the minimization or reduction of the extreme loads on the wind turbine components. In an embodiment, the features of a wind turbine controller may be incorporated into an integrated controller.

Two types of control are usually performed by the system. The supervisory control allows the turbine to go from one operational state to the other. Examples of operational states are start-up, power production, normal shutdown, emergency shutdown, standby, and so forth.

The second type of control performed by a wind turbine is called closed-loop control and occurs at a given operational state of the turbine to keep the turbine at some defined characteristic or operational boundary for that state.

The wind turbine thrust force $F_T$, the aerodynamic torque $T_r$, and the power $P_r$ vary according to:

$$\begin{cases} F_T = \frac{1}{2}\rho A C_T(\lambda, \Delta) V^2 \\ T_r = \frac{1}{2}\rho A R C_q(\lambda, \Delta) V^2 \\ P_r = \frac{1}{2}\rho A C_p(\lambda, \Delta) V^3 \end{cases} \quad \text{Equations 12A, 12B, 12C}$$

Where $\rho$ is the density of air, R is the rotor radius, A is the apparent rotor swept area (Equation 2), V is the wind speed, $C_T$ is the thrust coefficient, $C_q$ is the torque coefficient, and Cp is the power coefficient. All the non-dimensional coefficients ($C_T$, $C_q$, and Cp) depend on three parameters, the speed-tip ratio $\lambda$, the blade pitch angle $\Delta$, and the global offset angle $\varepsilon$. The speed-tip ratio is the ratio of the angular speed of the rotor $\omega$ at the tip of the blade over the wind speed V.

Typically, in power production mode, depending on the wind speed, two control regions called partial load and full load require different control strategies.

In partial load, when the wind speed is below the rated wind speed—the lowest wind speed at which the turbine produces the maximum power—the controller will vary the generator torque to maximize the aerodynamic power capture, while keeping the blade pitch angle $\Delta$ at its optimal setting.

Basically, the generator torque can be controlled to any desired value, which is proportional to the square of the filtered generator speed, with the aim of varying the rotor rotational speed to maintain a constant and optimal tip-speed ratio $\lambda$.

During power production, sudden variations of wind speed or directions can occur quite often at the site of floating wind turbines. These variations directly impact the overall magnitude and direction of the thrust force of the turbine applied to the rotor disk area in the direction of the wind. Viewed from the supporting platform far below the wind turbine hub, the thrust force represents an overturning moment to be withstood, and can yield high platform heel angles. Even if temporary, these high heel angles are detrimental to the overall system design life, and should be minimized during the unit lifetime.

In an embodiment, an integrated controller controls the wind turbine and the ballast pump simultaneously, in order to maintain the platform heel angle below a certain limit at all times or as desired. This controller may have platform control features integrated into a wind turbine controller modified to interact directly with the ballast pumps to minimize the heel angles of the floatation frame. A benefit brought by this is a rise in the structural design life of the floatation frame if the same amount of construction material (most of the case, it is steel) is used, without sacrificing the overall power output of the turbine.

Based on industry experience, heel angles of up to 15 degrees could be reached by a floating wind turbine platform when the maximum thrust of the wind turbine is applied at the hub height. If the two controllers are decoupled, as described with regard to FIG. 12, the platform marine system controller works independently of the wind turbine. A simple signal can be shared between the two controllers to shut down the turbine if a fault occurs on the platform.

If the two control systems are completely decoupled, the platform will experience high heel angles in sudden shifts of wind speed or direction. The reason lies behind the difference in time constants for the two control systems. The turbine controller usually acts very quickly on the scale of a second, since it is designed to adapt to the quick disturbances of wind speed due to turbulence. The marine system controller is working on a timeframe of about ten minutes, because of the time necessary to pump water from one column to another.

For example, if the wind shifts from the cut-in wind speed to the rated wind speed in a matter of minutes, an extreme heel angle of about 15 degrees could be experienced by the floating platform, until the marine system controller triggers the appropriate ballast pumps to bring the platform back to even keel. At this high heel angle, the power output of the turbine would be reduced by the cosine of the heel angle of 15 degrees, since the rotor swept area is reduced because the blade plane is not perpendicular to the wind, as discussed earlier.

Thus, a platform high heel angle results in some loss in turbine power output. So, the marine system controller, even if used independently of the turbine controller, presents the benefit of keeping the tower at the desired alignment most of the time, but high heel angles are still experienced during transients (such as turbine startups or shutdowns) or sudden shifts of wind speed or wind direction.

Figure 13:
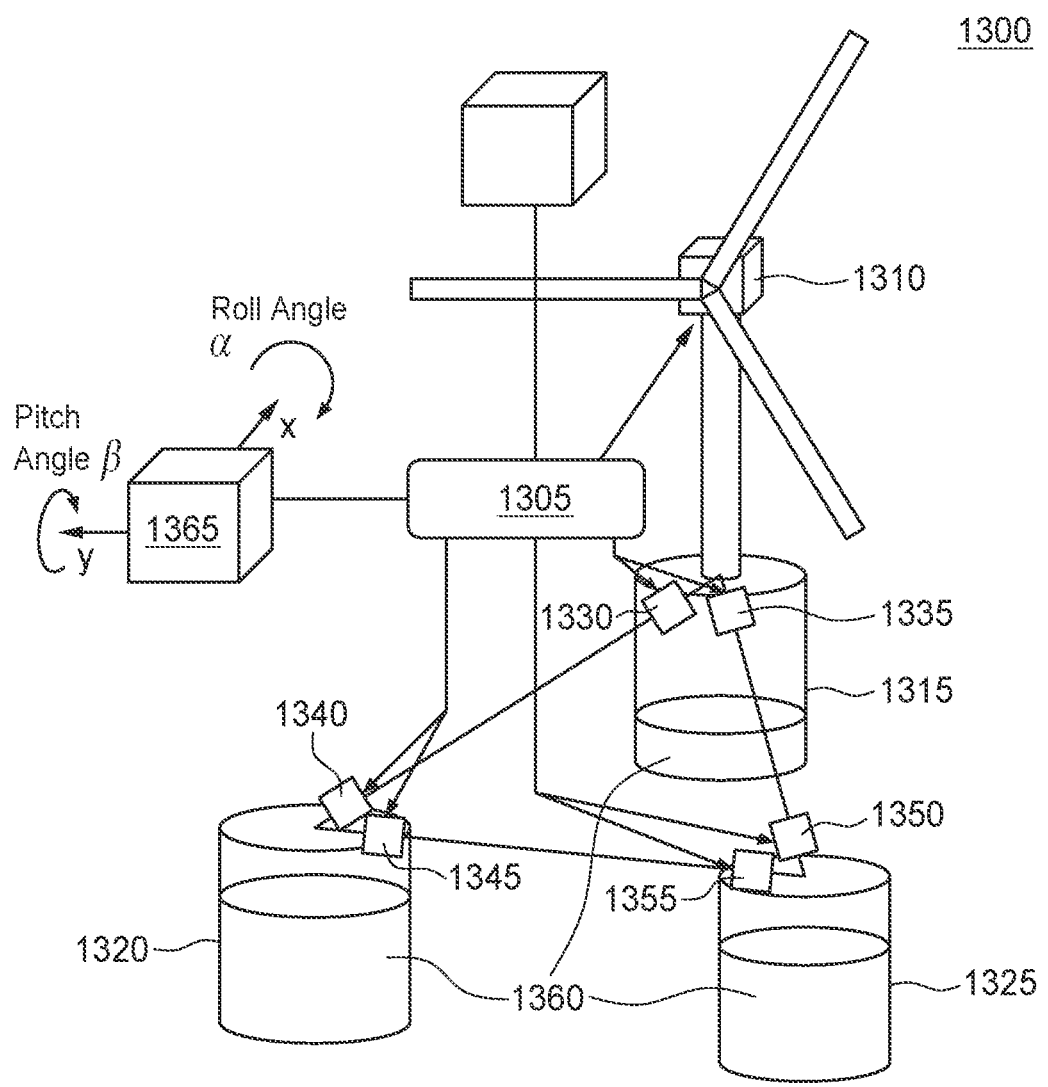
FIG. 13 shows a floating wind turbine platform with an integrated floating wind turbine controller according to an embodiment.

FIG. 13 shows a floating wind turbine platform 1300 with an integrated floating wind turbine and platform controller 1305. In a specific embodiment of this invention, the wind turbine and platform controller 1305 directly controls the platform pumps (1330, 1335, 1340, 1345, 1350, and 1355), in order to remedy the issues presented by two decoupled controllers. The platform pitch and roll angle information obtained by motion sensors 1365 can be used directly by the turbine controller to keep the platform heel angle at, or within a desired range of a target inclination (see the discussion with regard to FIG. 10), at all times or as desired.

The wind turbine controller 1305 would control either the generator torque or the blade pitch angle (or both at the same time). Thus, as an example of integrated control of both the wind turbine and the platform, integrated wind turbine controller 1305 may temporarily maintain the thrust of the turbine 1310 at a lower level, while water is being pumped from between the three columns (1315, 1320, and 1325). In other words, the change of thrust loading on the turbine 1310 resulting in an overturning moment will match or correspond to the change of righting moment due to the ballast water.

During that transition period—when the water 1360 is being pumped from column to column—the overall thrust and power output of the turbine could be lower, but the platform heel angle would also be lower and closer to the target angle, which would actually keep the power production higher, than if the platform heel angle was 15 degrees.

There is clearly a tradeoff between the platform maximum allowable heel angle and the power production. If the heel angle is kept too low, the change in thrust will be very small while water is being pumped, leading to a lower power output than if the ballast pumps were started after the change in thrust. If the heel angle is kept too high, the power output loss originates from the cosine term. In other words, an optimal point can be found at which the power production would be maximized at all times or sufficiently high, while the low-frequency platform heel angle would be kept low, leading to an increase in the design life of the platform (due to a reduction in cyclic low frequency loads caused by the weight of the rotor nacelle assembly in high heel angles).

However, in many cases, the main benefit of this system is truly the reduced amount of construction material for the platform, such as steel, which will improve the cost-effectiveness of floating wind turbine technologies.

In an embodiment, this integrated controller entails the modification of a conventional wind turbine controller to control the aerodynamic torque (or thrust force) of the wind turbine while allowing the activation of appropriate ballast water pumps.

Equations 12A, 12B, and 12C suggest that the thrust and the aerodynamic torque can be reduced if either the tip-speed ratio or the blade pitch are modified (or both at the same time). Therefore, these two parameters can be changed by the controller in partial load and in full load to maintain an aerodynamic torque that would minimize or reduce the platform heel angle.

At this stage, several options are considered depending on the operational state and the region of control for the wind turbine. For small angles, the platform heel angle h is a combination of roll and pitch and is defined as the squares root of the sum of the roll and pitch angles squared.

$$h = \sqrt{\alpha^2 + \beta^2} \qquad \text{Equation 13}$$

In an embodiment, in a first form, the generator torque demand could be adjusted to modify the tip-speed ratio $\lambda$ or the rotor speed, in order to reduce the aerodynamic thrust when the platform heel exceeds a certain set point. The appropriate pumps could then be started up by the control system, and the torque demand would be constantly adjusted, until the pumps are turned off, and normal operation can restart.

During that transition period, the generator torque would be partially controlled based on the platform heel angles measured from the inclinometers or accelerometers. The conventional wind component of the generator torque is obtained through a direct measurement and low-pass filtering of the rotor velocity. With this strategy in mind, the torque of the turbine would be derived as a sum of two terms, one due to the platform heel, and one due to wind-induced conventional rotor velocity.

If the platform reaches a heel angle greater than a given set point (for example 5 degrees), this new control loop is called by the system. Automatically, the right pumps are switched on, while the desired torque would be calculated slightly differently to temporarily reduce the rotor aerodynamic torque (or thrust). This control loop comprises two branches.

Figure 15:
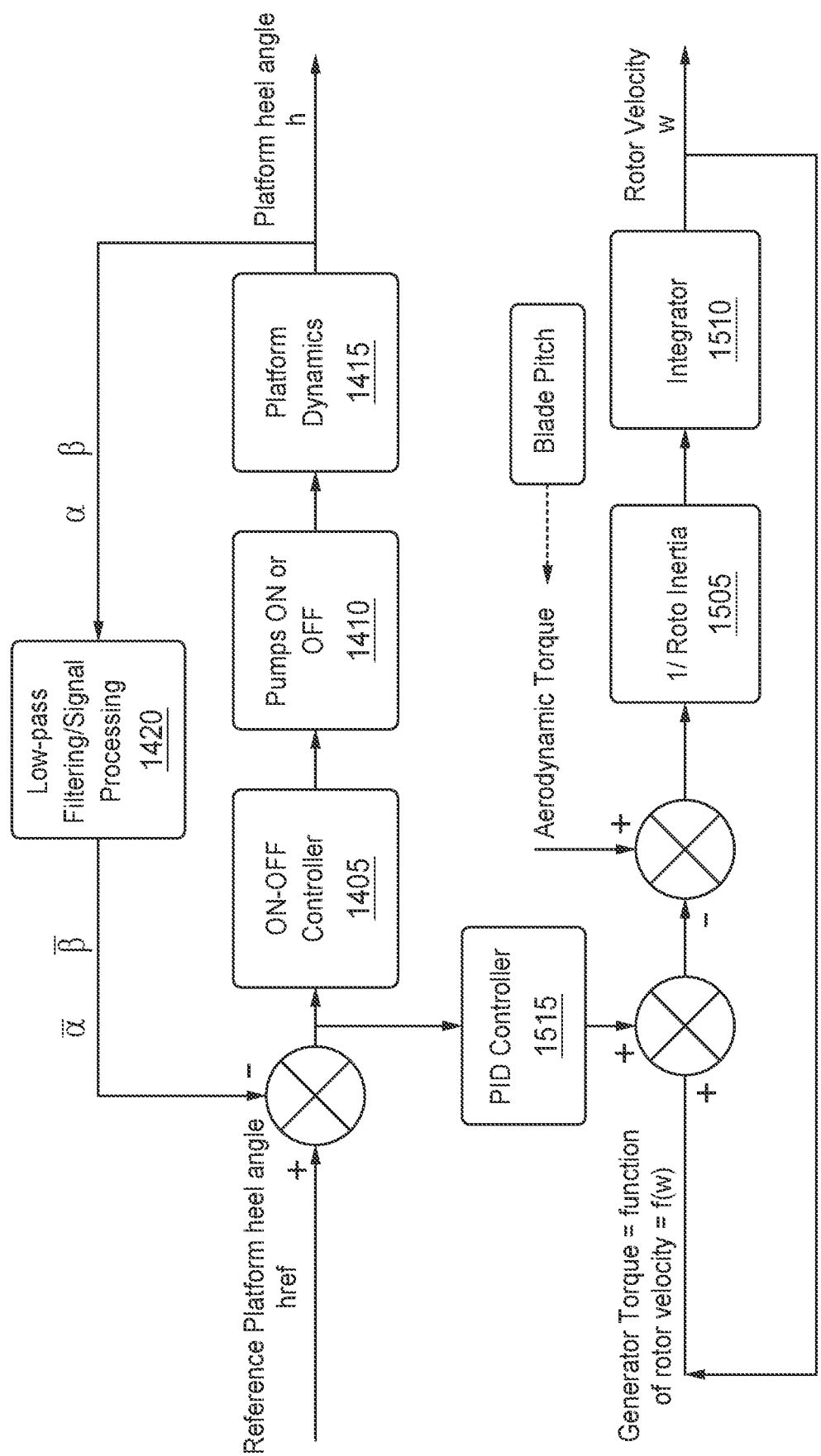
FIG. 15 is a flowchart for an integrated controller according to an embodiment.

FIG. 15 shows a flowchart for an integrated controller with a modification of the control loop of FIG. 14. The modification includes the control of the rotor velocity in which generator speed (or rotor velocity) is first used as an input, low-pass filtered, and the generator torque is determined based on a formula or lookup table. Usually, the generator torque is directly proportional to the filtered rotor velocity squared. The aerodynamic torque $T_R$ is an input to the controller, and will always try to be matched by the generator torque $T_G$ command, based on the actual rotor velocity ω. The rotor inertia J 1505, and an integrator block 1510 come into play to represent the dynamic of the system described by Equation 14:

$$T_R - T_G = J\dot{\omega} \qquad \text{Equation 14}$$

In full load, or above rated wind speed, the power produced is close to the rated power, but the turbine must limit or reduce the aerodynamic power extraction (or the Cp coefficient) so as not to exceed turbine component design loads, such as the generator. This time, the rotor spins at a constant angular speed ω, so the only parameter that can reduce the power coefficient Cp is the blade pitch angle Δ.

The generator torque is also held constant at the rated torque, but could also be controlled. The additional aerodynamic power that could be extracted is thus shed by varying the blade pitch angle. An increase in blade pitch angle—when the leading edge of the blade is turned into the wind—diminishes the aerodynamic torque by decreasing the angle of attack, hence the lift on the blades. Here, conventional PI or PID control strategies are used to modify the blade pitch angle, based on the generator speed error between the filtered generator speed and the rated generator speed. In some cases, notch filters are used to prevent excessive controller actions at the natural frequency of certain turbine components, such as the drivetrain torsional frequency or the blade passing frequency.

The control loop is otherwise as described with reference to FIG. 14 and uses the platform roll and pitch angles as input signals, calculates the heel angle of the platform in the frame of reference of the nacelle turned into the wind, low-pass filters this heel angle, and finally computes the second component of the desired torque using a PID controller 1515 based on the platform heel angle error.

Figure 16:
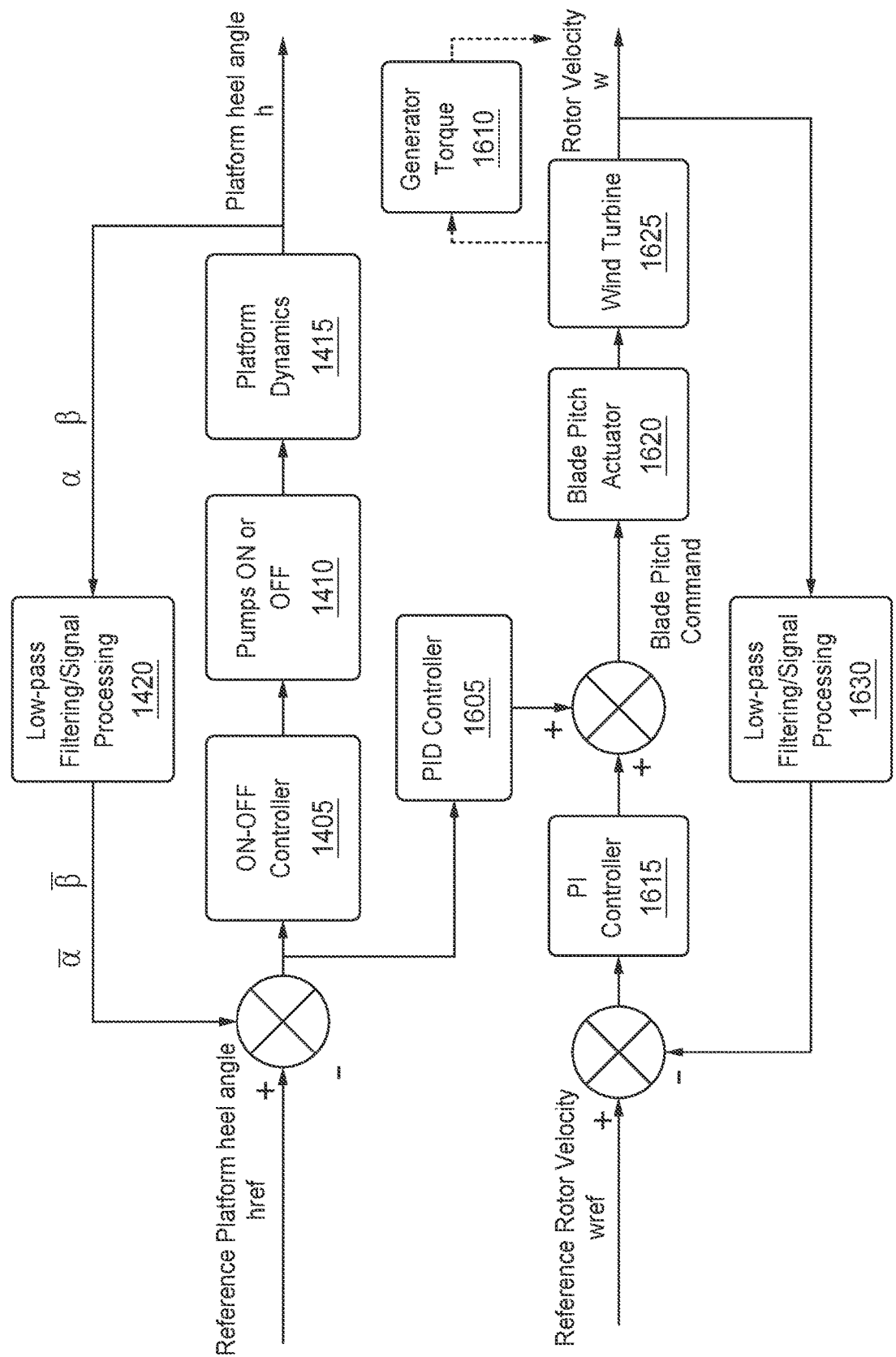
FIG. 16 is a flowchart for an integrated controller according to an embodiment.

FIG. 16 shows a flowchart for an integrated controller with a modification of the standard blade pitch control loop in which the rotor velocity ω is measured, properly filtered and processed by 1630, and compared to its setpoint $\omega_{ref}$ (the rotor velocity at rated power), which creates an error signal. This rotor speed error signal is fed into a PI controller 1615 to compute the pitch command sent to the blade pitch actuator 1620. The wind turbine 1625 continues to operate as the blade pitch angles are being controlled.

During a turbine startup, the PI controller 1615 sends a command to the blade pitch actuator 1620 to pitch the blades from feather (90 degrees) to the run position and let the wind accelerate the rotor until a certain speed is reached. The generator is then engaged and the wind turbine 1625 starts producing power.

Similarly, for a normal turbine shutdown, the blades are pitched from their run position to feather. The generator is disengaged, when the turbine slows enough to drop the power to zero.

As shown in FIG. 16, the blade pitch angle may also be modified to control the aerodynamic torque. The blade pitch command is computed based on the sum of the typical filtered rotor speed error component calculated with a PID controller 1615, and a second component based on the platform heel angle error calculated again with a PID controller 1605. The new pitch command is the sum of these two components only if the platform error exceeds a certain band of heel angle about the optimum angle $\delta_{optimum}$ (for example +/−1, 2, or 5 degrees around $\delta_{optimum}$). In that case again, the controller presents a control loop with two branches, one branch dealing with the component based on the filtered rotor speed error, the other branch taking care of the other component based on the filtered platform heel angle error.

In an embodiment, a combination of these two forms of control is provided for both regions of turbine operation, in partial load and in full load. The modification of both the generator torque 1610 and the blade pitch angle in both regions would add flexibility in the control system, regardless of the control region. For certain types of turbine, it is already not atypical to see the blade pitch angle being controlled below rated wind speed, and the generator torque being controlled above rated wind speed.

Thus, on the same principle, the generator torque controller in the first form and the blade pitch controller in the second form could be combined to temporarily control the aerodynamic torque, while the water is being shifted from column to column. The combination of both strategies would improve the overall performance of this integrated controller.

Gentle startup and shutdowns procedures are definitively desirable, as they can be intense fatigue life drainers for the turbine and the floatation frame. In a specific embodiment, a feature of the invention also relates to a controller that is used in the case of startup and shutdowns on the same principles as the ones described in operation.

In the case of a startup, the blade pitch may be controlled to go from feather-to-pitch at the same speed as the ballast water is moved from column to column, so that the heel angle of the platform remains at or near the target angle at all times during the procedure. In the case of a shutdown, the blades would be controlled to go from pitch-to-feather while allowing the ballast water to maintain the platform at or near the target angle, until the turbine is stopped.

In both cases, the filtered platform heel angle error could be used as an input to an extra branch in the control loop to calculate the blade pitch at all times. As a result, the blade pitch increase or decrease is much slower than in the case of a conventional controller. Similarly, the generator torque ramp-up or ramp-down time could be increased to match the required ballasting time, in order to minimize or reduce the platform heel angle error at all times or as desired during startup and shutdowns. Again, a combination of blade pitch and torque control can be used simultaneously to produce the same intended results.

In an embodiment, the decoupled marine system 1205 and wind turbine controllers 1210, or integrated wind turbine and platform controller 1305 may receive information allowing the controller to anticipate a change in wind speed or direction at the wind turbine. Such an anticipated change may, for example, trigger a startup or shutdown of the turbine, or prompt the controller to adjust the turbine yaw to point the turbine into the anticipated wind direction. In either case, before the actual arrival of the anticipated wind change, the controller may pre-transfer water from column to column before any turbine action is performed. For instance, in the case of a turbine shutdown, the platform may be pre-inclined while the turbine is still spinning, so that half of the water ballast transfer is done upfront. The turbine would then be shut down, and the ballast water would continue to be transferred between columns until the platform is at or near the target angle.

The embodiment may be used to improve power production as well when the wind turbine or floating platform detects any significant anticipated change in wind speed or direction. In advance of correcting yaw or blade pitch or both, ballast water may be pre-adjusted in the platform columns, so that the error in the heel angle experienced by the platform with the eventual change in the wind speed or direction may be reduced. At all times or as desired, the amount of water in the different columns can be estimated based on the thrust force of the turbine and its applied direction, or based on the wind speed and the wind direction. Using such information, information, a look-up table may be derived that the controller could consult to pre-adjust the ballast water of the platform to anticipate the wind change and reduce the error in the platform inclination caused by the wind change.

Thus, in this embodiment, the controller may use two extra input signals: an estimate of the anticipated wind speed and anticipated wind direction. A pre-compensation algorithm would be applied to pre-adjust the amount of ballast water in the different columns. Instruments such as anemometers or Light Detection and Ranging or Laser Imaging Detection and Ranging (LIDAR) sensors can be installed for that purpose.

This strategy leads to two possibilities: it could be a complementary approach to refine the first integrated controller described in the previous section (more information comes from the wind measurements), or it could be a much simpler integrated controller decoupled with existing wind turbine control schemes (variable torque and pitch controllers), and therefore could be implemented in a much easier fashion.

Figure 17:
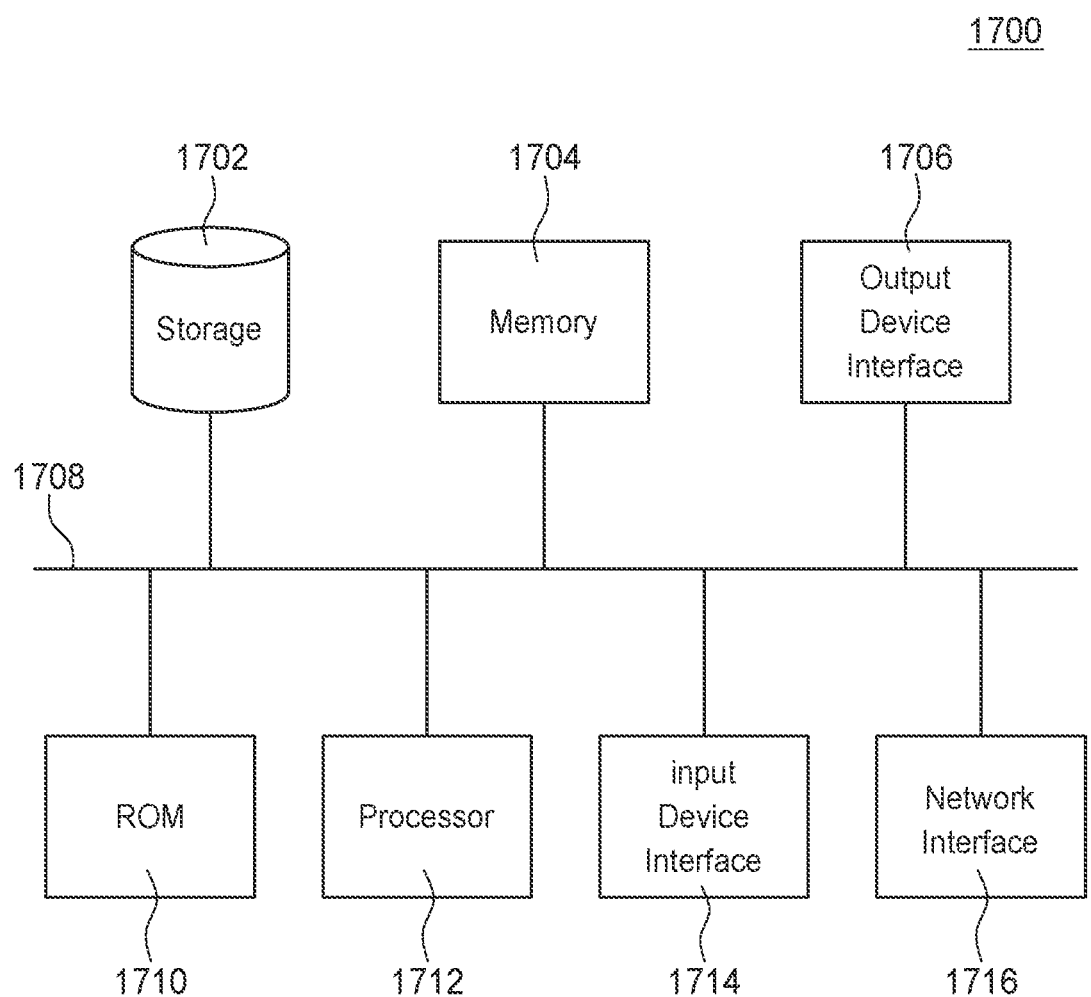
FIG. 17 conceptually illustrates an example electronic system with which some embodiments of the subject technology may be implemented.

FIG. 17 conceptually illustrates an example electronic system 1700 with which some embodiments may be implemented. Electronic system 1700 can be a computer, phone, PDA, or any other sort of electronic device. Such an electronic system includes various types of computer readable media and interfaces for various other types of computer readable media. Electronic system 1700 includes a bus 1708, processing unit(s) 1712, a system memory 1704, a read-only memory (ROM) 1710, a permanent storage device 1702, an input device interface 1714, an output device interface 1706, and a network interface 1716.

Bus 1708 collectively represents all system, peripheral, and chipset buses that communicatively connect the numerous internal devices of electronic system 1700. For instance, bus 1708 communicatively connects processing unit(s) 1712 with ROM 1710, system memory 1704, and permanent storage device 1702.

From these various memory units, processing unit(s) 1712 retrieves instructions to execute and data to process in order to execute the processes of the subject disclosure. The processing unit(s) can be a single processor or a multi-core processor in different embodiments.

ROM 1710 stores static data and instructions that are needed by processing unit(s) 1712 and other modules of the electronic system. Permanent storage device 1702, on the other hand, is a read-and-write memory device. This device is a non-volatile memory unit that stores instructions and data even when electronic system 1700 is off. Some embodiments of the subject disclosure use a mass-storage device (such as a magnetic or optical disk and its corresponding disk drive) as permanent storage device 1702.

Other embodiments use a removable storage device (such as a floppy disk, flash drive, and its corresponding disk drive) as permanent storage device 1702 Like permanent storage device 1702, system memory 1704 is a read-and-write memory device. However, unlike storage device 1702, system memory 1704 is a volatile read-and-write memory, such as random access memory. System memory 1704 stores some of the instructions and data that the processor needs at runtime. In some embodiments, the processes of the subject disclosure are stored in system memory 1704, permanent storage device 1702, and/or ROM 1710. For example, the various memory units include instructions for controlling an inclination of a floating wind turbine platform in accordance with some embodiments. From these various memory units, processing unit(s) 1712 retrieves instructions to execute and data to process in order to execute the processes of some embodiments.

Bus 1708 also connects to input and output device interfaces 1714 and 1706. Input device interface 1714 enables the user to communicate information and select commands to the electronic system. Input devices used with input device interface 1714 include, for example, alphanumeric keyboards and pointing devices (also called "cursor control devices"). Output device interface 1706 enables, for example, the display of images generated by the electronic system 1700. Output devices used with output device interface 1706 include, for example, printers and display devices, such as cathode ray tubes (CRT) or liquid crystal displays (LCD). Some embodiments include devices such as a touchscreen that functions as both input and output devices.

Finally, as shown in FIG. 17, bus 1708 also couples electronic system 1700 to a network (not shown) through a network interface 1716. In this manner, the computer can be a part of a network of computers, such as a local area network, a wide area network, or an Intranet, or a network of networks, such as the Internet. Any or all components of electronic system 1700 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software aspects of the subject disclosure can be implemented as sub-parts of a larger program while remaining distinct software aspects of the subject disclosure. In some embodiments, multiple software aspects can also be implemented as separate programs. Finally, any combination of separate programs that together implement a software aspect described here is within the scope of the subject disclosure. In some embodiments, the software programs, when installed to operate on one or more electronic systems, define one or more specific machine embodiments that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray™ discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an embodiment of the subject matter described in this specification, or any combination of one or more such back end, middleware, or front end components. The components of the system can be interconnected by any form or medium of digital data communication, e.g., a communication network. Examples of communication networks include a local area network and a wide area network, an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

The following paragraphs contain enumerated embodiments of the invention.

1. A method for controlling an inclination of a first floating wind turbine platform to optimize power production, the first floating wind turbine platform including: a generator connected to a shaft having a shaft longitudinal axis; a set of turbine blades connected to the shaft and defining a blade plane that is perpendicular to the shaft longitudinal axis; a tower having a tower longitudinal axis, the shaft being connected to the tower such that there is a non-zero angle between the blade plane and the tower longitudinal axis; at least three stabilizing columns, each of the at least three stabilizing columns having an internal volume for containing ballast; and a ballast system for distributing ballast, the first floating wind turbine platform having a rated wind speed, a minimum wind speed, and a floating position in which the tower longitudinal axis is vertical, the method comprising: receiving, by a control software module executing on a processor of the ballast system, inclination data associated with an inclination of the first floating wind turbine platform; receiving, by the control software module, first wind speed data and first wind direction data; determining, by the control software module using the first wind speed data, a platform wind speed; determining, by the control software module using the first wind direction data, an angle of difference between the shaft longitudinal axis and a wind direction, the angle of difference having a vertical component relative to a horizontal plane; causing, by the control software module when the platform wind speed is below the minimum wind speed, the ballast system to distribute ballast to maintain the first floating wind turbine platform at the floating position; and causing, by the control software module when the platform wind speed is greater than the minimum wind speed and less that the rated wind speed, the ballast system to distribute ballast to reduce the vertical component of the angle of difference to a first vertical target angle chosen to optimize power produced by the generator.

2. The method of claim 1 further comprising: receiving, by the control software module, the first vertical target angle from a second floating wind turbine platform.

3. The method of claim 2 further comprising: receiving, by the control software module from the second floating wind turbine platform, second wind speed data and second wind direction data; and comparing, by the control software module, the second wind speed data to the first wind speed data and the second wind direction data to the first wind direction data, wherein the ballast system is caused to distribute ballast to reduce the vertical component of the angle of difference to the received first vertical target angle when both: the platform wind speed is greater than the minimum wind speed and less that the rated wind speed; and the comparison indicates the first wind speed is within a first threshold from the second wind speed and the first wind direction is within a second threshold from the second wind direction.

4. The method of claim 2, wherein the first vertical target angle is received from the second wind turbine platform in response to the second floating wind turbine platform receiving the first wind speed data and the first wind direction data.

5. The method of claim 1, wherein the first vertical target angle is a chosen vertical target angle selected from among a plurality of potential vertical target angles in a numerical look-up table, the chosen vertical target angle selected based on at least one from the group: first wind speed, first wind direction, sea state, platform motion, and turbine motion.

6. The method of claim 1, wherein the first vertical target angle is a computed vertical target angle computed as a function of at least one from the group: first wind speed, first wind direction, sea state, platform motion, and turbine motion.

7. The method of claim 1 further comprising: receiving, by the control software module executing on the processor, first power data regarding power produced by the generator when the platform is inclined at the first vertical target angle; modifying, by the control software module, the first vertical target angle to a second vertical target angle; receiving, by the control software module, second power data regarding power produced by the generator when the platform is inclined at the second vertical target angle; and maintaining, by the control software module, the inclination of the first floating wind turbine platform at the second vertical target angle when the second power data is greater than the first power data.

8. The method of claim 1, wherein: the first wind speed data and first wind direction data represent wind conditions at a location a distance from the first floating wind turbine platform; the determining the platform wind speed uses the first wind speed data, the first wind direction data, the location, and the distance; the platform wind speed is an estimation of wind speed at the platform at a future time; and the vertical component relative to the horizontal plane is an estimate of the vertical component at the future time; the method further comprising: estimating, by the control software module based on the vertical component, a preparation amount of time required by the ballast system to reduce the vertical component to the first vertical target angle, wherein: the causing, by the control software module when the platform wind speed is greater than the minimum wind speed and less that the rated wind speed, the ballast system to distribute ballast to reduce the vertical component of the angle of difference to a first vertical target angle chosen to optimize power produced by the generator includes: causing, by the control software module when the platform wind speed is greater than the minimum wind speed and less that the rated wind speed, the ballast system to begin to distribute ballast to reduce the vertical component of the angle of difference to the first vertical target angle the preparation amount of time in advance of the future time.

9. A non-transitory computer-readable medium comprising instructions stored therein according to any of enumerated embodiments 1-8.

10. A ballast system for distributing ballast for controlling an inclination of a floating wind turbine platform to optimize power production, the floating wind turbine platform including: a generator connected to a shaft having a shaft longitudinal axis; a set of turbine blades connected to the shaft and defining a blade plane that is perpendicular to the shaft longitudinal axis; a tower having a tower longitudinal axis, the shaft being connected to the tower such that there is a non-zero angle between the blade plane and the tower longitudinal axis; and at least three stabilizing columns, each of the at least three stabilizing columns having an internal volume for containing ballast, the first floating wind turbine platform having a rated wind speed, a minimum wind speed, and a floating position in which the tower longitudinal axis is vertical, the ballast system comprising: at least one processor; and a machine-readable medium comprising instructions stored therein according to any of enumerated embodiments 1-8.

11. A method for controlling an inclination of a first floating wind turbine platform to reduce loads, the first floating wind turbine platform including: a generator connected to a shaft having a shaft longitudinal axis; a set of turbine blades connected to the shaft and defining a blade plane that is perpendicular to the shaft longitudinal axis; a tower having a tower longitudinal axis, the shaft being connected to the tower such that there is a non-zero angle between the blade plane and the tower longitudinal axis; at least three stabilizing columns, each of the at least three stabilizing columns having an internal volume for containing ballast; and a ballast system for distributing ballast, the first floating wind turbine platform having a minimum wind speed and a floating position in which the tower longitudinal axis is vertical, the method comprising: receiving, by a control software module executing on a processor of the ballast system, inclination data associated with an inclination of the first floating wind turbine platform; receiving, by the control software module, first wind speed data and first wind direction data; determining, by the control software module using the first wind speed data, a platform wind speed; determining, by the control software module using the first wind direction data, an angle of difference between the shaft longitudinal axis and a wind direction, the angle of difference having a vertical component relative to a horizontal plane; causing, by the control software module when the platform wind speed is below the minimum wind speed, the ballast system to distribute ballast to maintain the first floating wind turbine platform at the floating position; and causing, by the control software module when the platform wind speed is greater than the minimum wind speed, the ballast system to distribute ballast to reduce the vertical component of the angle of difference to a first vertical target angle chosen to minimize loads applied to the first floating wind turbine platform.

12. The method of claim 11 further comprising: receiving, by the control software module, the first vertical target angle from a second floating wind turbine platform.

13. The method of claim 12 further comprising: receiving, by the control software module from the second floating wind turbine platform, second wind speed data and second wind direction data; and comparing, by the control software module, the second wind speed data to the first wind speed data and the second wind direction data to the first wind direction data, wherein the ballast system is caused to distribute ballast to reduce the vertical component of the angle of difference to the received first vertical target angle when both: the platform wind speed is greater than the minimum wind speed; and the comparison indicates the first wind speed is within a first threshold from the second wind speed and the first wind direction is within a second threshold from the second wind direction.

14. The method of claim 12, wherein the first vertical target angle is received from the second wind turbine platform in response to the second floating wind turbine platform receiving the first wind speed data and the first wind direction data.

15. The method of claim 11, wherein the first vertical target angle is a chosen vertical target angle selected from among a plurality of potential vertical target angles in a numerical look-up table, the chosen vertical target angle selected based on at least one from the group: wind speed, wind direction, sea state, platform motion, and turbine motion.

16. The method of claim 11, wherein the first vertical target angle is a computed vertical target angle computed as a function of at least one from the group: wind speed, wind direction, sea state, platform motion, and turbine motion.

17. The method of claim 11 further comprising: receiving, by the control software module executing on the processor, first power data regarding power produced by the generator when the platform is inclined at the first vertical target angle; modifying, by the control software module, the first vertical target angle to a second vertical target angle; receiving, by the control software module, second power data regarding power produced by the generator when the platform is inclined at the second vertical target angle; and maintaining, by the control software module, the inclination of the first floating wind turbine platform at the second vertical target angle when the second power data is greater than the first power data.

18. The method of claim 11, wherein: the first wind speed data and first wind direction data represent wind conditions at a location a distance from the first floating wind turbine platform; the determining the platform wind speed uses the first wind speed data, the first wind direction data, the location, and the distance; the platform wind speed is an estimation of wind speed at the platform at a future time; and the vertical component relative to the horizontal plane is an estimate of the vertical component at the future time; the method further comprising: estimating, by the control software module based on the vertical component, a preparation amount of time required by the ballast system to reduce the vertical component to the first vertical target angle, wherein: the causing, by the control software module when the platform wind speed is greater than the minimum wind speed, the ballast system to distribute ballast to reduce the vertical component of the angle of difference to a first vertical target angle chosen to minimize loads applied to the first floating wind turbine platform includes: causing, by the control software module when the platform wind speed is greater than the minimum wind speed and less that the rated wind speed, the ballast system to begin to distribute ballast to reduce the vertical component of the angle of difference to the first vertical target angle the preparation amount of time in advance of the future time.

19. A non-transitory computer-readable medium comprising instructions stored therein according to any of enumerated embodiments 11-18.

20. A ballast system for distributing ballast for controlling an inclination of a floating wind turbine platform to reduce loads, the floating wind turbine platform including: a generator connected to a shaft having a shaft longitudinal axis; a set of turbine blades connected to the shaft and defining a blade plane that is perpendicular to the shaft longitudinal axis; a tower having a tower longitudinal axis, the shaft being connected to the tower such that there is a non-zero angle between the blade plane and the tower longitudinal axis; and at least three stabilizing columns, each of the at least three stabilizing columns having an internal volume for containing ballast, the first floating wind turbine platform having a minimum wind speed and a floating position in which the tower longitudinal axis is vertical, the ballast system comprising: at least one processor; and a machine-readable medium comprising instructions stored therein according to any of enumerated embodiments 11-18.

21. A method for controlling an inclination of a floating wind turbine platform to optimize power production, the floating wind turbine platform including: a generator connected to a shaft having a shaft longitudinal axis; a set of turbine blades connected to the shaft and defining a blade plane that is perpendicular to the shaft longitudinal axis; a tower having a tower longitudinal axis, the shaft being connected to the tower such that there is a non-zero angle between the blade plane and the tower longitudinal axis; at least three stabilizing columns, each of the at least three stabilizing columns having an internal volume for containing ballast; and a ballast system for distributing ballast, the floating wind turbine platform having a rated wind speed, a minimum wind speed, and a floating position in which the tower longitudinal axis is vertical, the method comprising: receiving, by a control module executing on a processor, inclination data associated with an inclination of the floating wind turbine platform; receiving, by the control module, wind speed data and wind direction data; determining, by the control module using the wind speed data, a nacelle wind speed; determining, by the control module using the wind direction data, an angle of difference between the shaft longitudinal axis and a wind direction, the angle of difference having a vertical component relative to a horizontal plane; causing, by the control module when the nacelle wind speed is below the minimum wind speed, the ballast system to distribute ballast to maintain the floating wind turbine platform at the floating position; and causing, by the control module when the nacelle wind speed is greater than the minimum wind speed and less that the rated wind speed, the ballast system to distribute ballast to reduce the vertical component of the angle of difference to a vertical target angle chosen to optimize power produced by the generator.

22. The method of embodiment 21, wherein the angle of difference includes the vertical component and a horizontal component within the horizontal plane, and the method further comprises: causing, by the control module when the nacelle wind speed is greater than the minimum wind speed and less that the rated wind speed, the nacelle to rotate with respect to the tower longitudinal axis to reduce the horizontal component of the angle of difference to a horizontal target angle chosen to optimize power produced by the generator.

23. The method of embodiment 21, wherein the vertical target angle is zero degrees.

24. The method of embodiment 21, wherein the vertical target angle is a chosen vertical target angle selected from among a plurality of potential vertical target angles in a numerical look-up table, the chosen vertical target angle selected based on at least one from the group: wind speed, wind direction, sea state, platform motion, and turbine motion.

25. The method of embodiment 21, wherein the vertical target angle is a computed vertical target angle computed as a function of at least one from the group: wind speed, wind direction, sea state, platform motion, and turbine motion.

26. The method of embodiment 21, wherein the vertical target angle is transmitted by another platform in the wind farm which experienced or is experiencing the same conditions and already performed the optimization.

27. The method of embodiment 21 further comprising: receiving, by the control module executing on the processor, power data regarding power produced by the generator, wherein the vertical target angle is chosen based in part on the power data.

28. The method of embodiment 21, wherein: the wind speed data and wind direction data represent wind conditions at a location a distance from the floating wind turbine platform; the determining the nacelle wind speed uses the wind speed data, the direction data, the location, and the distance; the nacelle wind speed is an estimation of wind speed at the nacelle at a future time; and the vertical component relative to the horizontal plane is an estimate of the vertical component at the future time; the method further comprising: estimating, by the control module based on the vertical component, a preparation amount of time required by the ballast system to reduce the vertical component to the vertical target angle, wherein: the causing, by the control module when the nacelle wind speed is greater than the minimum wind speed and less that the rated wind speed, the ballast system to distribute ballast to reduce the vertical component of the angle of difference to a vertical target angle chosen to optimize power produced by the generator includes: causing, by the control module when the nacelle wind speed is greater than the minimum wind speed and less that the rated wind speed, the ballast system to begin to distribute ballast to reduce the vertical component of the angle of difference to the vertical target angle the preparation amount of time in advance of the future time.

29. The method of embodiment 21, wherein the floating wind turbine platform is level in the floating position.

30. The method of embodiment 21, wherein the distributing ballast to reduce the angle of difference between the blade plane and vertical causes the floating wind turbine platform to incline into the wind, or causes the floating wind turbine platform to incline away from the wind.

31. A non-transitory computer-readable medium comprising instructions stored therein according to any of enumerated embodiments 21-30.

32. A system for controlling an inclination of a floating wind turbine platform to optimize power production, the floating wind turbine platform including: a generator connected to a shaft having a shaft longitudinal axis; a set of turbine blades connected to the shaft and defining a blade plane that is perpendicular to the shaft longitudinal axis; a tower having a tower longitudinal axis, the shaft being connected to the tower such that there is a non-zero angle between the blade plane and the tower longitudinal axis; at least three stabilizing columns, each of the at least three stabilizing columns having an internal volume for containing ballast; and a ballast system for distributing ballast, the floating wind turbine platform having a rated wind speed, a minimum wind speed, and a floating position in which the tower longitudinal axis is vertical, the system comprising: one or more processors; and a machine-readable medium comprising instructions stored therein according to any of enumerated embodiments 21-30.

33. A method for controlling an inclination of a floating wind turbine platform to reduce static loads at the base of tower and on the floating structure, the floating wind turbine platform including: a generator connected to a shaft having a shaft longitudinal axis; a set of turbine blades connected to the shaft and defining a blade plane that is perpendicular to the shaft longitudinal axis; a tower having a tower longitudinal axis, the shaft being connected to the tower such that there is a non-zero angle between the blade plane and the tower longitudinal axis; at least three stabilizing columns, each of the at least three stabilizing columns having an internal volume for containing ballast; and a ballast system for distributing ballast, the floating wind turbine platform having a minimum wind speed and a floating position in which the tower longitudinal axis is vertical, the method comprising: receiving, by a control module executing on a processor, inclination data associated with an inclination of the floating wind turbine platform; receiving, by the control module, wind speed data and wind direction data; determining, by the control module using the wind speed data, a nacelle wind speed; determining, by the control module using the wind direction data, an angle of difference between the shaft longitudinal axis and a wind direction, the angle of difference having a vertical component relative to a horizontal plane; causing, by the control module when the nacelle wind speed is below the minimum wind speed, the ballast system to distribute ballast to maintain the floating wind turbine platform at the floating position; and causing, by the control module when the nacelle wind speed is greater than the minimum wind speed, the ballast system to distribute ballast to reduce the vertical component of the angle of difference to a vertical target angle chosen to minimize loads applied to the floating wind turbine platform.

34. The method of embodiment 33, wherein the angle of difference includes the vertical component and a horizontal component within the horizontal plane, and the method further comprises; causing, by the control module when the nacelle wind speed is greater than the minimum wind speed and less that the rated wind speed, the nacelle to rotate with respect to the tower longitudinal axis to reduce the horizontal component of the angle of difference to a horizontal target angle chosen to minimize loads applied to the floating wind turbine platform.

35. The method of embodiment 33, wherein the vertical target angle is zero degrees.

36. The method of embodiment 33, wherein the vertical target angle is a chosen vertical target angle selected from among a plurality of potential vertical target angles in a numerical look-up table, the chosen vertical target angle selected based on at least one from the group: wind speed, wind direction, sea state, platform motion, and turbine motion.

37. The method of embodiment 33, wherein the vertical target angle is a computed vertical target angle computed as a function of at least one from the group: wind speed, wind direction, sea state, platform motion, and turbine motion.

38. The method of embodiment 33, wherein the vertical target angle is transmitted by another platform in the wind farm which experienced or is experiencing the same conditions and already performed the optimization.

39. The method of embodiment 33 further comprising: receiving, by the control module executing on the processor, power data regarding power produced by the generator, wherein the vertical target angle is chosen based in part on the power data or the stress data measured on the structure.

40. The method of embodiment 33 further comprising: receiving, by the control module executing on the processor, stress data regarding the stress at critical locations at the base of tower and on the floating platform, wherein the vertical target angle is chosen based in part on the stress data.

41. The method of embodiment 33, wherein: the wind speed data and wind direction data represent wind conditions at a location a distance from the floating wind turbine platform; the determining the nacelle wind speed uses the wind speed data, the direction data, the location, and the distance; the nacelle wind speed is an estimation of wind speed at the nacelle at a future time; and the vertical component relative to the horizontal plane is an estimate of the vertical component at the future time; the method further comprising: estimating, by the control module based on the vertical component, a preparation amount of time required by the ballast system to reduce the vertical component to the vertical target angle, wherein: the instructions causing, by the control module when the nacelle wind speed is greater than the minimum wind speed, the ballast system to distribute ballast to reduce the vertical component of the angle of difference to a vertical target angle chosen to minimize loads applied to the floating wind turbine platform include: causing, by the control module when the nacelle wind speed is greater than the minimum wind speed and less that the rated wind speed, the ballast system to begin to distribute ballast to reduce the vertical component of the angle of difference to the vertical target angle the preparation amount of time in advance of the future time.

42. A non-transitory computer-readable medium comprising instructions stored therein according to any of enumerated embodiments 33-41.

43. A system for controlling an inclination of a floating wind turbine platform to reduce loads, the floating wind turbine platform including: a generator connected to a shaft having a shaft longitudinal axis; a set of turbine blades connected to the shaft and defining a blade plane that is perpendicular to the shaft longitudinal axis; a tower having a tower longitudinal axis, the shaft being connected to the tower such that there is a non-zero angle between the blade plane and the tower longitudinal axis; at least three stabilizing columns, each of the at least three stabilizing columns having an internal volume for containing ballast; and a ballast system for distributing ballast, the floating wind turbine platform having a minimum wind speed and a floating position in which the tower longitudinal axis is vertical, the system comprising: one or more processors; and a machine-readable medium comprising instructions stored therein according to any of enumerated embodiments 33-41.

It is understood that any specific order or hierarchy of steps in any disclosed process is an illustration of an approach. Based upon design preferences, it is understood that the specific order or hierarchy of steps in the processes may be rearranged, or that not all illustrated steps be performed. Some of the steps may be performed simultaneously.

Moreover, the separation of various apparatus components in the embodiments described above should not be understood as requiring such separation in all embodiments.

The previous description is provided to enable any person skilled in the art to practice the various aspects described herein. Various modifications to these aspects will be readily apparent to those skilled in the art, and the generic principles defined herein may be applied to other aspects. Thus, the embodiments are not intended to be limited to the aspects shown herein, but are to be accorded the full scope consistent with the language embodiments, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims.

We claim:

1. A non-transitory computer-readable medium comprising instructions stored therein for controlling an inclination of a first floating wind turbine platform to optimize power production, the first floating wind turbine platform including: a generator connected to a shaft having a shaft longitudinal axis; a set of turbine blades connected to the shaft and defining a blade plane that is perpendicular to the shaft longitudinal axis; a tower having a tower longitudinal axis, the shaft being connected to the tower such that there is a non-zero angle between the blade plane and the tower longitudinal axis; at least three stabilizing columns, each of the at least three stabilizing columns having an internal volume for containing ballast; and a ballast system for distributing ballast, the first floating wind turbine platform having a rated wind speed, a minimum wind speed, and a floating position in which the tower longitudinal axis is vertical, and the instructions, which when executed by at least one processor of the ballast system, cause the at least one processor to perform operations comprising:
receiving inclination data associated with an inclination of the first floating wind turbine platform;
receiving first wind speed data and first wind direction data;
determining, using the first wind speed data, a platform wind speed;
determining, using the first wind direction data, an angle of difference between the shaft longitudinal axis and a wind direction, the angle of difference having a vertical component relative to a horizontal plane;
causing, when the platform wind speed is below the minimum wind speed, the ballast system to distribute ballast to maintain the first floating wind turbine platform at the floating position; and
causing, when the platform wind speed is greater than the minimum wind speed and less that the rated wind speed, the ballast system to distribute ballast to lean the first floating wind turbine platform a first angle of inclination chosen to reduce the vertical component of the angle of difference to a first vertical target angle to optimize power production.

2. The computer-readable medium of claim 1, the instructions further causing the at least one processor to perform operations comprising:
receiving the first angle of inclination from a second floating wind turbine platform.

3. The computer-readable medium of claim 2, the instructions further causing the at least one processor to perform operations comprising:
receiving, from the second floating wind turbine platform, second wind speed data and second wind direction data; and
comparing the second wind speed data to the first wind speed data and the second wind direction data to the first wind direction data,
wherein the ballast system is caused to distribute ballast to lean the first floating wind turbine platform the first angle of inclination when both: the platform wind speed is greater than the minimum wind speed and less that the rated wind speed; and the comparison indicates the first wind speed is within a first threshold from the second wind speed and the first wind direction is within a second threshold from the second wind direction.

4. The computer-readable medium of claim 2, wherein the first angle of inclination is received from the second wind turbine platform in response to the second floating wind turbine platform receiving the first wind speed data and the first wind direction data.

5. The computer-readable medium of claim 1, wherein the first vertical target angle is a chosen vertical target angle selected from among a plurality of potential vertical target angles in a numerical look-up table, the chosen vertical target angle selected based on at least one from the group: first wind speed, first wind direction, sea state, platform motion, and turbine motion.

6. The computer-readable medium of claim 1, wherein the first vertical target angle is a computed vertical target angle computed as a function of at least one from the group: first wind speed, first wind direction, sea state, platform motion, and turbine motion.

7. The computer-readable medium of claim 1, the instructions further causing the at least one processor to perform operations comprising:
receiving first power data regarding power produced by the generator when the platform has attained the first vertical target angle;
modifying the first vertical target angle to a second vertical target angle;
receiving second power data regarding power produced by the generator when the platform has attained the second vertical target angle; and
maintaining the first floating wind turbine platform at a second angle of inclination associated with the second vertical target angle when the second power data is greater than the first power data.

8. The computer-readable medium of claim 1, wherein:
the first wind speed data and first wind direction data represent wind conditions at a location a distance from the first floating wind turbine platform;
the determining the platform wind speed uses the first wind speed data, the first wind direction data, the location, and the distance;
the platform wind speed is an estimation of wind speed at the platform at a future time; and
the vertical component relative to the horizontal plane is an estimate of the vertical component at the future time; the instructions further causing the at least one processor to perform operations comprising:
estimating, based on the first angle of inclination, a preparation amount of time required by the ballast system to lean the first floating wind turbine platform the first angle of inclination, wherein:
the causing, when the platform wind speed is greater than the minimum wind speed and less that the rated wind speed, the ballast system to distribute ballast to lean the first floating wind turbine platform a first angle of inclination chosen to reduce the vertical component of the angle of difference to a first vertical target angle chosen to optimize power production includes:
causing, when the platform wind speed is greater than the minimum wind speed and less that the rated wind speed, the ballast system to begin to distribute ballast to lean the first floating wind turbine platform a first angle of inclination chosen to reduce the vertical component of the angle of difference to the first vertical target angle the preparation amount of time in advance of the future time.

9. The computer-readable medium of claim 1, wherein:
the first floating wind turbine platform is one of a plurality of floating wind turbine platforms of a windfarm;
the first angle of inclination is chosen to optimize the power production of the windfarm; and
the causing the ballast system to distribute ballast to lean the first floating wind turbine platform a first angle of inclination results in the first floating wind turbine platform producing sub-optimal power.

10. A ballast system for distributing ballast for controlling an inclination of a first floating wind turbine platform to optimize power production, the first floating wind turbine platform including: a generator connected to a shaft having a shaft longitudinal axis; a set of turbine blades connected to the shaft and defining a blade plane that is perpendicular to the shaft longitudinal axis; a tower having a tower longitudinal axis, the shaft being connected to the tower such that there is a non-zero angle between the blade plane and the tower longitudinal axis; and at least three stabilizing columns, each of the at least three stabilizing columns having an internal volume for containing ballast, the first floating wind turbine platform having a rated wind speed, a minimum wind speed, and a floating position in which the tower longitudinal axis is vertical, the ballast system comprising: at least one processor; and a machine-readable medium comprising instructions stored therein, which when executed by the at least one processor, cause the at least one processor to perform operations comprising:

receiving inclination data associated with an inclination of the first floating wind turbine platform;

receiving first wind speed data and first wind direction data;

determining, using the first wind speed data, a platform wind speed;

determining, using the first wind direction data, an angle of difference between the shaft longitudinal axis and a wind direction, the angle of difference having a vertical component relative to a horizontal plane;

causing, when the platform wind speed is below the minimum wind speed, the ballast system to distribute ballast to maintain the first floating wind turbine platform at the floating position; and causing, when the platform wind speed is greater than the minimum wind speed and less that the rated wind speed, the ballast system to distribute ballast to lean the first floating wind turbine platform a first angle of inclination chosen to reduce the vertical component of the angle of difference to a first vertical target angle to optimize power production.

11. The system of claim 10, the instructions further causing the at least one processor to perform operations comprising:

receiving the first angle of inclination from a second floating wind turbine platform.

12. The system of claim 11, the instructions further causing the at least one processor to perform operations comprising:

receiving, from the second floating wind turbine platform, second wind speed data and second wind direction data; and comparing the second wind speed data to the first wind speed data and the second wind direction data to the first wind direction data, wherein the ballast system is caused to distribute ballast to lean the first floating wind turbine platform the first angle of inclination when both: the platform wind speed is greater than the minimum wind speed and less that the rated wind speed; and the comparison indicates the first wind speed is within a first threshold from the second wind speed and the first wind direction is within a second threshold from the second wind direction.

13. The system of claim 11, wherein the first angle of inclination is received from the second wind turbine platform in response to the second floating wind turbine platform receiving the first wind speed data and the first wind direction data.

14. The system of claim 10, wherein the first vertical target angle is a chosen vertical target angle selected from among a plurality of potential vertical target angles in a numerical look-up table, the chosen vertical target angle selected based on at least one from the group: first wind speed, first wind direction, sea state, platform motion, and turbine motion.

15. The system of claim 10, wherein the first vertical target angle is a computed vertical target angle computed as a function of at least one from the group: first wind speed, first wind direction, sea state, platform motion, and turbine motion.

16. The system of claim 10, the instructions further causing the at least one processor to perform operations comprising:

receiving first power data regarding power produced by the generator when the platform has attained the first vertical target angle;

modifying the first vertical target angle to a second vertical target angle;

receiving second power data regarding power produced by the generator when the platform has attained the second vertical target angle; and maintaining the first floating wind turbine platform at a second angle of inclination associated with the second vertical target angle when the second power data is greater than the first power data.

17. The system of claim 10, wherein:

the first wind speed data and first wind direction data represent wind conditions at a location a distance from the first floating wind turbine platform;

the determining the platform wind speed uses the first wind speed data, the first wind direction data, the location, and the distance;

the platform wind speed is an estimation of wind speed at the platform at a future time; and the vertical component relative to the horizontal plane is an estimate of the vertical component at the future time; the instructions further causing the at least one processor to perform operations comprising:

estimating, based on the first angle of inclination, a preparation amount of time required by the ballast system to lean the first floating wind turbine platform the first angle of inclination, wherein:

the causing, when the platform wind speed is greater than the minimum wind speed and less that the rated wind speed, the ballast system to distribute ballast to lean the first floating wind turbine platform a first angle of inclination chosen to reduce the vertical component of the angle of difference to a first vertical target angle chosen to optimize power production includes:

causing, when the platform wind speed is greater than the minimum wind speed and less that the rated wind speed, the ballast system to begin to distribute ballast to lean the first floating wind turbine platform a first angle of inclination chosen to reduce the vertical component of the angle of difference to the first vertical target angle the preparation amount of time in advance of the future time.

18. The system of claim 10, wherein:

the first floating wind turbine platform is one of a plurality of floating wind turbine platforms of a windfarm;

the first angle of inclination is chosen to optimize the power production of the windfarm; and the causing the ballast system to distribute ballast to lean the first floating wind turbine platform a first angle of inclination results in the first floating wind turbine platform producing sub-optimal power.

19. A non-transitory computer-readable medium comprising instructions stored therein for controlling an inclination of a first floating wind turbine platform to reduce loads, the first floating wind turbine platform including: a generator connected to a shaft having a shaft longitudinal axis; a set of turbine blades connected to the shaft and defining a blade plane that is perpendicular to the shaft longitudinal axis; a tower having a tower longitudinal axis, the shaft being connected to the tower such that there is a non-zero angle between the blade plane and the tower longitudinal axis; at least three stabilizing columns, each of the at least three stabilizing columns having an internal volume for containing ballast; and a ballast system for distributing ballast, the first floating wind turbine platform having a rated wind speed, a minimum wind speed, and a floating position in which the tower longitudinal axis is vertical, and the instructions, which when executed by at least one processor of the ballast system, cause the at least one processor to perform operations comprising:
receiving inclination data associated with an inclination of the first floating wind turbine platform;
receiving first wind speed data and first wind direction data;
determining, using the first wind speed data, a platform wind speed;
determining, using the first wind direction data, an angle of difference between the shaft longitudinal axis and a wind direction, the angle of difference having a vertical component relative to a horizontal plane;
causing, when the platform wind speed is below the minimum wind speed, the ballast system to distribute ballast to maintain the first floating wind turbine platform at the floating position; and
causing, when the platform wind speed is greater than the minimum wind speed and less that the rated wind speed, the ballast system to distribute ballast to lean the first floating wind turbine platform a first angle of inclination chosen to reduce the vertical component of the angle of difference to a first vertical target angle to minimize loads applied to the first floating wind turbine platform.

20. The computer-readable medium of claim 19, the instructions further causing the at least one processor to perform operations comprising:
receiving the first angle of inclination from a second floating wind turbine platform.

21. The computer-readable medium of claim 20, the instructions further causing the at least one processor to perform operations comprising:
receiving, from the second floating wind turbine platform, second wind speed data and second wind direction data; and
comparing, the second wind speed data to the first wind speed data and the second wind direction data to the first wind direction data,
wherein the ballast system is caused to distribute ballast to lean the first floating wind turbine platform the first angle of inclination when both: the platform wind speed is greater than the minimum wind speed; and the comparison indicates the first wind speed is within a first threshold from the second wind speed and the first wind direction is within a second threshold from the second wind direction.

22. The computer-readable medium of claim 20, wherein the first angle of inclination is received from the second wind turbine platform in response to the second floating wind turbine platform receiving the first wind speed data and the first wind direction data.

23. The computer-readable medium of claim 19, wherein the first vertical target angle is a chosen vertical target angle selected from among a plurality of potential vertical target angles in a numerical look-up table, the chosen vertical target angle selected based on at least one from the group: wind speed, wind direction, sea state, platform motion, and turbine motion.

24. The computer-readable medium of claim 19, wherein the first vertical target angle is a computed vertical target angle computed as a function of at least one from the group: wind speed, wind direction, sea state, platform motion, and turbine motion.

25. The computer-readable medium of claim 19, the instructions further causing the at least one processor to perform operations comprising:
receiving first power data regarding power produced by the generator when the platform has attained the first vertical target angle;
modifying the first vertical target angle to a second vertical target angle;
receiving second power data regarding power produced by the generator when the platform has attained the second vertical target angle; and
maintaining the first floating wind turbine platform at a second angle of inclination associated with the second vertical target angle when the second power data is greater than the first power data.

26. The computer-readable medium of claim 19, wherein:
the first wind speed data and first wind direction data represent wind conditions at a location a distance from the first floating wind turbine platform;
the determining the platform wind speed uses the first wind speed data, the first wind direction data, the location, and the distance;
the platform wind speed is an estimation of wind speed at the platform at a future time; and
the vertical component relative to the horizontal plane is an estimate of the vertical component at the future time;
the instructions further causing the at least one processor to perform operations comprising:
estimating, based on the first angle of inclination, a preparation amount of time required by the ballast system to lean the first floating wind turbine platform the first angle of inclination, wherein:
the causing, when the platform wind speed is greater than the minimum wind speed, the ballast system to distribute ballast to lean the first floating wind turbine platform a first angle of inclination chosen to reduce the vertical component of the angle of difference to a first vertical target angle chosen to minimize loads applied to the first floating wind turbine platform includes:
causing, when the platform wind speed is greater than the minimum wind speed and less that the rated wind speed, the ballast system to begin to distribute ballast to lean the first floating wind turbine platform a first angle of inclination chosen to reduce the vertical component of the angle of difference to the first vertical target angle the preparation amount of time in advance of the future time.

27. A ballast system for distributing ballast for controlling an inclination of a first floating wind turbine platform to reduce loads, the first floating wind turbine platform including: a generator connected to a shaft having a shaft longitudinal axis; a set of turbine blades connected to the shaft and defining a blade plane that is perpendicular to the shaft longitudinal axis; a tower having a tower longitudinal axis, the shaft being connected to the tower such that there is a non-zero angle between the blade plane and the tower longitudinal axis; and at least three stabilizing columns, each of the at least three stabilizing columns having an internal volume for containing ballast, the first floating wind turbine platform having a rated wind speed, a minimum wind speed, and a floating position in which the tower longitudinal axis is vertical, the ballast system comprising: at least one processor; and a machine-readable medium comprising instructions stored therein, which when executed by the at least one processor, cause the at least one processor to perform operations comprising:

receiving inclination data associated with an inclination of the first floating wind turbine platform;

receiving first wind speed data and first wind direction data;

determining, using the first wind speed data, a platform wind speed;

determining, using the first wind direction data, an angle of difference between the shaft longitudinal axis and a wind direction, the angle of difference having a vertical component relative to a horizontal plane;

causing, when the platform wind speed is below the minimum wind speed, the ballast system to distribute ballast to maintain the first floating wind turbine platform at the floating position;

and causing, when the platform wind speed is greater than the minimum wind speed and less that the rated wind speed, the ballast system to distribute ballast to lean the first floating wind turbine platform a first angle of inclination chosen to reduce the vertical component of the angle of difference to a first vertical target angle to minimize loads applied to the first floating wind turbine platform.

28. The system of claim 27, the instructions further causing the at least one processor to perform operations comprising:

receiving the first angle of inclination from a second floating wind turbine platform.

29. The system of claim 28, the instructions further causing the at least one processor to perform operations comprising:

receiving, from the second floating wind turbine platform, second wind speed data and second wind direction data; and comparing the second wind speed data to the first wind speed data and the second wind direction data to the first wind direction data, wherein the ballast system is caused to distribute ballast to lean the first floating wind turbine platform the first angle of inclination when both: the platform wind speed is greater than the minimum wind speed; and the comparison indicates the first wind speed is within a first threshold from the second wind speed and the first wind direction is within a second threshold from the second wind direction.

30. The system of claim 28, wherein the first angle of inclination is received from the second wind turbine platform in response to the second floating wind turbine platform receiving the first wind speed data and the first wind direction data.

31. The system of claim 27, wherein the first vertical target angle is a chosen vertical target angle selected from among a plurality of potential vertical target angles in a numerical look-up table, the chosen vertical target angle selected based on at least one from the group: wind speed, wind direction, sea state, platform motion, and turbine motion.

32. The system of claim 27, wherein the first vertical target angle is a computed vertical target angle computed as a function of at least one from the group: wind speed, wind direction, sea state, platform motion, and turbine motion.

33. The system of claim 27, the instructions further causing the at least one processor to perform operations comprising:

receiving first power data regarding power produced by the generator when the platform has attained the first vertical target angle;

modifying the first vertical target angle to a second vertical target angle;

receiving second power data regarding power produced by the generator when the platform has attained the second vertical target angle; and maintaining the first floating wind turbine platform at a second angle of inclination associated with the second vertical target angle when the second power data is greater than the first power data.

34. The system of claim 27, wherein:

the first wind speed data and first wind direction data represent wind conditions at a location a distance from the first floating wind turbine platform;

the determining the platform wind speed uses the first wind speed data, the first wind direction data, the location, and the distance;

the platform wind speed is an estimation of wind speed at the platform at a future time; and the vertical component relative to the horizontal plane is an estimate of the vertical component at the future time; the instructions further causing the at least one processor to perform operations comprising:

estimating, based on the first angle of inclination, a preparation amount of time required by the ballast system to lean the first floating wind turbine platform the first angle of inclination, wherein:

the causing, when the platform wind speed is greater than the minimum wind speed, the ballast system to distribute ballast to lean the first floating wind turbine platform a first angle of inclination chosen to reduce the vertical component of the angle of difference to a first vertical target angle chosen to minimize loads applied to the first floating wind turbine platform includes:

causing, when the platform wind speed is greater than the minimum wind speed and less that the rated wind speed, the ballast system to begin to distribute ballast to lean the first floating wind turbine platform a first angle of inclination chosen to reduce the vertical component of the angle of difference to the first vertical target angle the preparation amount of time in advance of the future time.

* * * * *